(12) United States Patent
Wilhelmsson et al.

(10) Patent No.: US 10,305,711 B2
(45) Date of Patent: May 28, 2019

(54) METHODS AND DEVICES FOR MODULATING AND CODING DATA PACKETS

(71) Applicant: TELEFONAKTIEBOLAGET LM ERICSSON (PUBL), Stockholm (SE)

(72) Inventors: Leif Wilhelmsson, Dalby (SE); Miguel Lopez, Solna (SE); Nafiseh Shariati, Solna (SE); Dennis Sundman, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 201 days.

(21) Appl. No.: 15/111,713

(22) PCT Filed: Jun. 9, 2016

(86) PCT No.: PCT/SE2016/050560
§ 371 (c)(1),
(2) Date: Jul. 14, 2016

(87) PCT Pub. No.: WO2017/213564
PCT Pub. Date: Dec. 14, 2017

(65) Prior Publication Data
US 2018/0123841 A1 May 3, 2018

(51) Int. Cl.
*H04L 27/00* (2006.01)
*H04L 1/08* (2006.01)
(Continued)

(52) U.S. Cl.
CPC ......... *H04L 27/0008* (2013.01); *H04H 60/07* (2013.01); *H04L 1/007* (2013.01);
(Continued)

(58) Field of Classification Search
CPC ..... H04L 1/0003; H04L 1/007; H04L 1/0026; H04L 1/0031; H04L 1/1854;
(Continued)

(56) References Cited

U.S. PATENT DOCUMENTS 8,472,549 B2 * 6/2013 Zhang ................. H04B 7/0452
375/260
8,559,371 B2 * 10/2013 Wu ........................... H04L 5/02
370/328
(Continued)

FOREIGN PATENT DOCUMENTS

EP 1211837 A1 6/2002
EP 1422861 A1 5/2004
(Continued)

OTHER PUBLICATIONS

International Search Report and the Written Opinion of the International Searching Authority, issued in corresponding International Application No. PCT/SE2016/050560, dated Jul. 25, 2017, 17 pages.
(Continued)

*Primary Examiner* — Vineeta S Panwalkar
(74) *Attorney, Agent, or Firm* — Rothwell, Figg, Ernst & Manbeck, P.C.

(57) ABSTRACT

A method for modulating and coding a data packet comprising digitally encoded information. The method comprises selecting a hierarchy of modulation and coding schemes to use for modulation and coding of the digitally encoded information. The method also comprises identifying, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data. The method further comprises
(Continued)

performing modulation and coding of the first set of data using a modulation and coding scheme with high order modulation in order to create a first layer of the data packet.

20 Claims, 20 Drawing Sheets

(51) Int. Cl.
*H04L 27/34* (2006.01)
*H04H 60/07* (2008.01)
*H04L 1/00* (2006.01)

(52) U.S. Cl.
CPC .......... *H04L 1/0041* (2013.01); *H04L 1/0053* (2013.01); *H04L 1/08* (2013.01); *H04L 27/3472* (2013.01); *H04L 27/3488* (2013.01); *H04L 2001/0093* (2013.01); *H04L 2001/0098* (2013.01)

(58) Field of Classification Search
CPC ........... H04L 1/1887; H04L 2001/0098; H04L 27/0012; H04L 5/0055; H04L 27/0008; H04L 1/0053; H04L 1/0041; H04L 27/3488; H04L 27/3472; H04L 1/08; H04L 2001/0093; H04H 60/07
See application file for complete search history.

(56) References Cited

U.S. PATENT DOCUMENTS

| | | | | |
|---|---|---|---|---|
| 2007/0297533 | A1* | 12/2007 | Chitrapu | ............... H04L 27/183 375/308 |
| 2009/0138774 | A1 | 5/2009 | Singh et al. | |
| 2015/0326360 | A1 | 11/2015 | Malladi et al. | |

FOREIGN PATENT DOCUMENTS

| | | |
|---|---|---|
| EP | 1422892 A1 | 5/2004 |
| EP | 2110978 A2 | 10/2009 |
| EP | 2408161 A1 | 1/2012 |
| WO | 2004105337 A1 | 12/2004 |
| WO | 2010039013 A2 | 4/2010 |
| WO | 2014082915 A1 | 6/2014 |

OTHER PUBLICATIONS

Zheng Yan-Xu et al. "HARQ Bit Selection Algorithm" IEEE-SA, vol. 802.16, XP68101555, 2009, 12 pages.
Novelty Search Report dated Mar. 31, 2016, 8 pages.
Written Opinion of the International Preliminary Examining Authority, issued in corresponding International Application No. PCT/SE2016/050560, dated Apr. 26, 2018, 6 pages.

* cited by examiner

METHODS AND DEVICES FOR MODULATING AND CODING DATA PACKETS

CROSS REFERENCE TO RELATED APPLICATION(S)

This application is a 35 U.S.C. § 371 National Phase Entry Application from PCT/SE2016/050560, filed Jun. 9, 2016, designating the United States, the disclosure of which is incorporated herein in its entirety by reference.

TECHNICAL FIELD

The proposed technology generally relates to methods and devices for modulating and coding data packets comprising digitally encoded information. It also relates to methods and devices for transmitting such data packets and methods and devices for decoding and demodulating such data packets. It also relates to computer programs and apparatuses for modulating and coding data packets.

BACKGROUND

Internet of Things, IoT, is expected to increase the number of connected devices significantly. A vast majority of these devices will likely operate in unlicensed bands, in particular the 2.4 GHz ISM band. At the same time, there is also increased demand for using the unlicensed bands also for services that traditionally have been supported in licensed bands. As an example of the latter, third generation partnership project, 3GPP, that traditionally develop specifications only for licensed bands have now also developed versions of Long Term Evolution, LTE, which will operate in the 5 GHz unlicensed band.

Many times, the transmission to these kinds of devices will not be only to one specific device, but rather the transmission will be intended to several or even all devices associated with the network node. These kinds of transmissions referred to as multi-cast and broadcast, respectively, are in at least some aspects more challenging than unicast transmissions. One such challenge is that the different receivers for a multi-cast/broadcast signal typically experience very different receiver conditions. It is not really possible to optimize the transmission for each receiver individually. This implies that if the transmitted signal uses a high modulation and coding scheme, MCS, to obtain good spectrum efficiency, devices with poor receiver conditions will not be able to correctly receive the packet. Conversely, if a packet is sent with low MCS, which is robust, in order to ensure that as many devices as possible are able to decode the packet, those receivers that have favorable channel conditions will need to be receiving, i.e., be awake, for an unnecessarily long time, resulting in unnecessarily high power consumption. Since having some devices not receiving the packet is typically worse than having some devices using some additional energy, the most robust MCS is typically used.

In a situation with a transmission to only one receiver, the MCS is typically optimized by finding as high MCS as possible which can be received with not too high error rate, i.e., maximizing the throughput. The finding of the optimal, or at least suitable, MCS is commonly referred to as link adaptation, LA. LA can be done in many ways, and with or without explicit feedback from the receiver. Regardless how the LA is done, it does require some kind of feedback. Therefore, if no such feedback is available, one may also have to resort to the same approach as used in multi-cast and broadcast, namely to use the most robust MCS.

Multicasting and broadcasting are typically done by using the most robust MCS in order to ensure that as many devices as possible are able to receive the message. This is not energy efficient because the total time that all the receiving devices need to be awake becomes very large. Also in case the MCS is determined by the link requirements of the device with the lowest SNR, the devices with much better SNR will need to be receiving for a longer time than the channel conditions actually allow. The reason is that the MCS used to modulate and code the packets must be robust enough so that the device with the weakest link and lowest SNR can decode it, and the packet length is directly related to the MCS. Since energy efficiency is very important in battery operated IoT devices, these approaches are not well suited.

The fact that different devices have different channel conditions can also be explored when forming the transmitted signal. As an example, in Digital Video Broadcasting for Terrestrial, DVB-T, which is standard for terrestrial broadcasting of e.g. TV programs in Europe, hierarchical modulation is used. In ETSI EN 300 744 "Digital Video Broadcasting, DVB; Framing structure, channel coding and modulation for digital terrestrial television" this is described in detail.

The idea with hierarchical modulation is to make some of the bits significantly more robust than the others by using a non-uniform signal constellation. An example of such a non-uniform constellation is depicted in FIG. 5, which is taken from the above mentioned standard. In this example the two first bits are unique for the respective quadrant, whereas the two last bits contains information about which one of the points within a quadrant. Clearly, the probability of a bit error will be lower for the two first bits than the two last ones. In DVB, the reason for having this kind of modulation was that some receivers, e.g., those implemented in a portable device with a small antenna with arbitrary direction can be expected to receive a much weaker signal than a receiver with a roof-top mounted antenna, which would be typical for a typical TV receiver in a home. However, the screen for a portable device may be, say, 5", whereas a TV at home may be of the size of 42" or even more. Therefore, the screen resolution required for a portable device typically is substantially less than what is needed for a home TV. Now as the receiver conditions are so fundamentally different due to the different antenna arrangements, one can transmit a low resolution picture using the most robust bits, and then complement this to obtain a high resolution picture by sending additional information using the less reliable bits. Since a large screen also is connected to a roof-top antenna, there is a good match.

Another technology which is based on similar ideas is Semi Orthogonal Multiple Access (SOMA). In SOMA, the fact that different receivers may experience very different conditions is explored. Essentially, in SOMA the more robust bits are used for transmission to a receiver with poor channel conditions, whereas the less robust bits are used for transmission to a receiver with good channel conditions. The receiver with poor channel condition then only use the more robust bits; it may not even be aware of that more information is transmitted. The receiver with good channel conditions, on the other hand, first decode the more robust bits, e.g. determine in what quadrant the signal constellation point is, and then once this knowledge is obtained, decode the remaining bits.

In US2015326360 there is disclosed a method for Non Orthogonal Multiple Access (NOMA) implementing hierarchical modulation. The method involves superposing enhancement modulation layer (EL) on base modulation layer (BL) and transmitting the result. The signal is transmitted to a plurality of User Equipments (UE) where the UEs with good reception can decode both layers. UEs with low reception quality can only decode the BL. It is possible to resend the EL only by using Hybrid Automatic Repeat Request (HARQ).

In WO2010039013 there is disclosed a method for coded relay cooperation with hierarchical modulation. The method involves transmitting the same layered information using relays and over several time slots. The method involves dividing a packet into a number of small blocks based on priority and modulated using hierarchical modulation In EP1211837 there is disclosed a method for transmitting packets with high error protection followed by packets with low error protection.

Despite the various efforts to overcome the problem with transmission to receivers with varying channel conditions there is still room for improvement. For example, if one were to find mechanisms that would alleviate the problems with broadcasting/multicasting to devices with different receiving capabilities it would enable a reduction of unnecessary signaling and detecting and hence reduce the energy consumption.

SUMMARY

It is an object to provide mechanisms whereby data packets can be transmitted to devices with varying receiving capabilities, e.g. having channel conditions ranging from good to bad. It is a particular object to provide mechanisms that enables data packets to be transmitted to a device with unknown receiving capabilities that enables the receiving device to extract the information in the data packet in a power efficient way. It is another particular object to provide mechanisms that enables the transmission of data packets to a large number of receiving devices, i.e. broadcasting or multicasting, having different receiving capabilities that enables that the receiving devices to extract the information from the data packet.

These and other objects are met by embodiments of the proposed technology.

According to a first aspect, there is provided a method for modulating and coding a data packet comprising digitally encoded information. The method comprises selecting a hierarchy of modulation and coding schemes to use for modulation and coding of the digitally encoded information. The method also comprises identifying, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data. The method further comprises performing modulation and coding of the first set of data using a modulation and coding scheme with high order modulation in order to create a first layer of the data packet. The method also comprises performing modulation and coding of the second set of data by using at least one modulation and coding scheme from the hierarchy of modulation and coding schemes having a modulation order that is lower than the high order modulation, in order to create at least one additional layer of the data packet.

According to a second aspect, there is provided a method for transmitting data packets comprising digitally encoded information. The method comprises generating a data packet, the data packet comprising a first layer of bits being modulated and coded through a modulation and coding scheme with high order modulation, the data packet also comprising at least one additional layer comprising bits of information different from the most robust bits of the first layer, the bits forming the at least one additional layer being a subset of the bits forming the first layer, and where the bits of each of the at least one additional layers have been modulated and coded using a modulation and coding scheme having a modulation order that is lower than the high order modulation of the modulation and coding scheme used to modulate and code the first layer. The method also comprises transmitting the data packet to at least one receiver to enable the receiver to select the particular layers to demodulate and decode in order to obtain the complete content of the data packet.

According to a third aspect, there is provided a method for demodulating and decoding information in a data packet comprising digitally encoded information. The method comprises detecting a data packet, the data packet comprising at least two layers, a first layer comprising a first set of data with bits modulated and coded using a modulation and coding scheme with high order modulation, and at least one additional layer comprising a second set of data with bits modulated and coded using a modulation and coding scheme with a modulation order lower than said high order modulation, the second set of data being a subset of the first set of data and comprising bits different from the most robust bits of the first set of data. The method also comprises performing demodulation and decoding of the first layer of the data packet. The method also comprises the step of determining whether to perform demodulation and decoding of the at least one additional layer. The method also comprises performing, based on the outcome of the determining step, demodulation and decoding of the at least one additional layer in order to retrieve the information carried by the bits in the second set of data.

According to a fourth aspect, there is provided a network device configured for modulating and coding a data packet comprising digitally encoded information. The network device is configured to select a hierarchy of modulation and coding schemes to use for modulation and coding of the digitally encoded information. The network device is also configured to identify, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data, the bits forming the at least one additional layer being a subset of the bits forming the first layer. The network device is also configured to perform modulation and coding of the first set of data using a modulation and coding scheme with high order modulation in order to create a first layer of the data packet. The network device is also configured to perform modulation and coding of the second set of data by using at least one modulation and coding scheme from the hierarchy of modulation and coding schemes having a modulation order that is lower than the high order modulation, in order to create at least one additional layer of the data packet.

According to a fifth aspect, there is provided a communication unit configured for transmitting data packets comprising digitally encoded information. The communication unit is configured to generate a data packet, the data packet comprising a first layer of bits being modulated and coded through a modulation and coding scheme with high order modulation, the data packet also comprising at least one additional layer comprising bits of information different from the most robust bits of the first layer, the bits forming the at least one additional layer being a subset of the bits forming the first layer, and where the bits of each of the at least one additional layers have been modulated and coded using a modulation and coding scheme having a modulation order that is lower than the high order modulation of the modulation and coding scheme used to modulate and code the first layer. The communication unit is also configured to transmit the data packet to at least one receiver to enable the receiver to select the particular layers to demodulate and decode in order to obtain the complete content of the data packet.

According to a sixth aspect, there is provided a communication unit configured to demodulate and decode information in a data packet comprising digitally encoded information. The communication unit is configured to detect a data packet, the data packet comprising at least two layers, a first layer comprising a first set of data with bits modulated and coded using a modulation and coding scheme with high order modulation, and at least one additional layer comprising a second set of data with bits modulated and coded using a modulation and coding scheme with a modulation order lower than said high order modulation, the second set of data comprising bits different from the most robust bits of the first set of data. The communication unit is also configured to perform demodulation and decoding of the first layer of the data packet. The communication unit is also configured to determine whether to perform demodulation and decoding of the at least one additional layer. The communication unit is also configured to perform, if it is determined that the at least one additional layer is to be demodulated and decoded, demodulation and decoding of the at least one additional layer in order to retrieve the information carried by the bits in the second set of data.

According to a seventh aspect, there is provided a computer program that comprises instructions, which when executed by at least one processor, cause the at least one processor to:

select a hierarchy of modulation and coding schemes to use for modulation and coding;

read digitally encoded information and identify, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data; and control modulation and coding of the first set of data using a modulation and coding scheme with high order modulation in order to create a first layer of a data packet; and control modulation and coding of the second set of data by using at least one modulation and coding scheme from the hierarchy of modulation and coding schemes having a modulation order that is lower than the high order modulation, in order to create at least one additional layer of a data packet.

According to an eighth aspect, there is provided a carrier comprising the computer program of the seventh aspect, wherein the carrier is one of an electronic signal, an optical signal, an electromagnetic signal, a magnetic signal, an electric signal, a radio signal, a microwave signal, or a computer-readable storage medium.

According to a ninth aspect, there is provided an apparatus for performing modulation and coding of a data packet comprising digitally encoded information. The apparatus comprises a selecting module for selecting a hierarchy of modulation and coding schemes to use for modulation and coding. The apparatus also comprises an identifying module for reading digitally encoded information and identify, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data. The apparatus also comprises a controlling module for controlling modulation and coding of the first set of data using a modulation and coding scheme with high order modulation in order to create a first layer of a data packet. The apparatus also comprises a controlling module for controlling modulation and coding of the second set of data by using at least one modulation and coding scheme from the hierarchy of modulation and coding schemes having a modulation order that is lower than the high order modulation, in order to create at least one additional layer of a data packet.

Embodiments of the proposed technology provides for an increased energy efficiency in many types of transmissions. This is in particular beneficial for broadcast applications where receiving communication units with better channel conditions may go to sleep early after receiving a packet, while not affecting the chance of successful reception for the receiving communication units with worse channel conditions. It is also beneficial for transmissions to communication units that have been asleep for a long period so that the channel conditions are unknown. The proposed technology enables the receiving communication unit to extract the content of the data packet in a power efficient way even though its channel condition is unknown to the transmitting communication unit.

There are also advantages associated with unicast transmissions, i.e. a transmission to a particular receiving unit. The proposed technology provides in particular mechanisms that allows a transmitting device to transmit data packet to a receiving unit without knowing the channel quality of the specific unit in a way that may make retransmissions of non-detected information redundant.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Before providing detailed embodiments of the proposed technology it may be beneficial to provide a bird's eye view of some of the features of the same. To this end the proposed technology provides mechanisms that allow a receiving communication unit with good channel conditions to receive the data in shorter period of time and in this way be able to reduce the power consumption. This is done in such a way that it still allows a receiving communication unit with poor channel conditions to receive the packet in the same time as would have been the case without employing the invention, i.e., there is no penalty introduced for these receivers. In order to achieve this, the data to be transmitted is encoded in a multi-layered data packet, where the content of the different layers are modulated and coded using varying modulation and coding schemes.

A particular object of the proposed technology is to provide a method for modulating and coding such a data packet. Another object is to provide a method for transmitting a data packet modulated and coded using the method of the first object. A third object is to provide a method for demodulating and decoding a data packet transmitted according to the second object. These methods are complementary insofar that the method for modulating and coding a data packet could be performed in either the data packet transmitting communication unit itself or in an entity external to the data packet transmitting communication unit, e.g. in the cloud or in some other information processing node. In the case where the data packet is modulated and coded in an external entity the final data packet could be provided to the transmitting communication unit for transmission.

Figure 1:
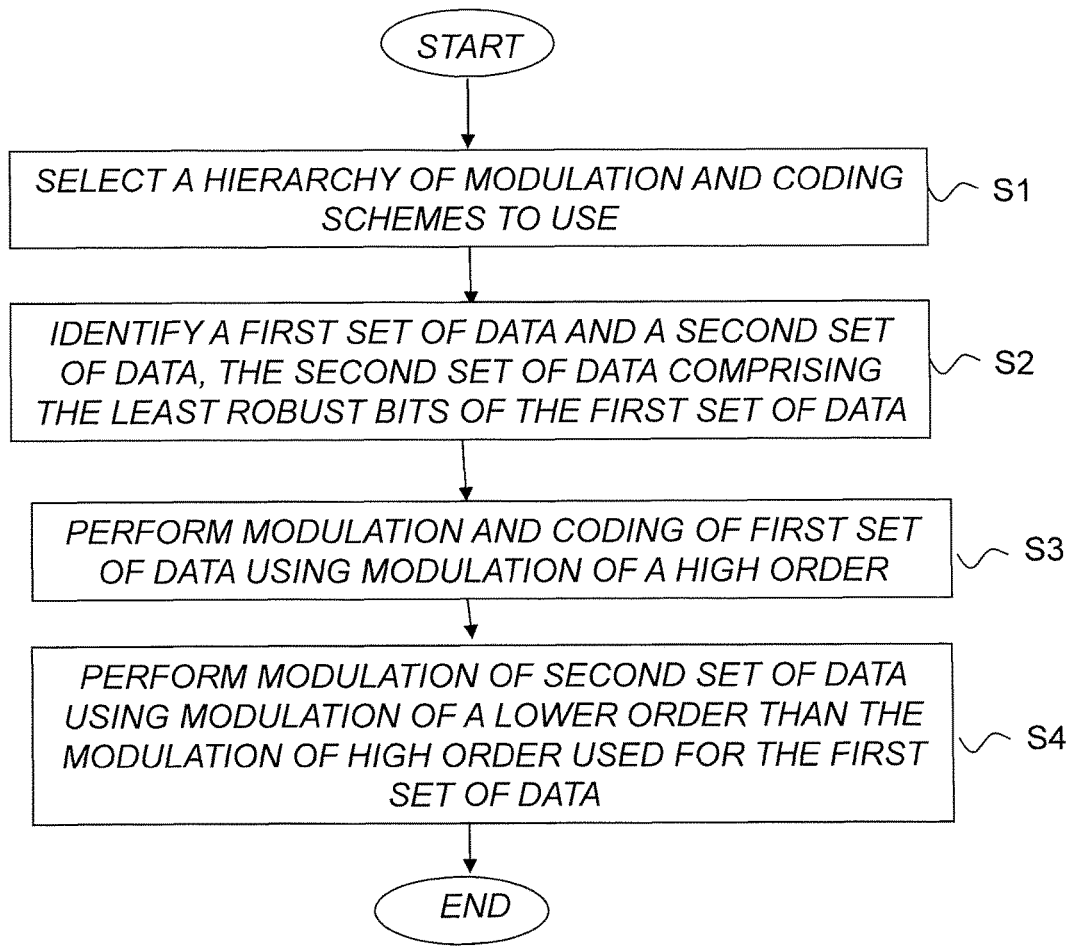
FIG. 1 is a flow diagram illustrating a method according to the proposed technology.

FIG. 1 is a schematic flow diagram illustrating an example of a method for modulating and coding a data packet comprising digitally encoded information. The method comprises selecting S1 a hierarchy of modulation and coding schemes to use for modulation and coding of the digitally encoded information. The method also comprises identifying S2, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data. The method further comprises performing S3 modulation and coding of the first set of data using a modulation and coding scheme with high order modulation in order to create a first layer of the data packet. The method also comprises performing S4 modulation and coding of the second set of data by using at least one modulation and coding scheme from the hierarchy of modulation and coding schemes having a modulation order that is lower than the high order modulation, in order to create at least one additional layer of the data packet.

In slightly different words, the method selects S1 a number of modulation and coding schemes to use. The selected modulation and coding schemes are hierarchical insofar that the order of modulation varies among the selected schemes from a highest modulation order to a lowest modulation order. Some possible modulation schemes to use are illustrated by means of constellation diagrams, or constellation mappings, in FIGS. 5, 6a, 6b, 12b, 13a and 13b. To clarify, a constellation diagram or, as it is sometimes referred to, a constellation mapping, is a representation of a signal modulated by means of a particular digital modulation scheme. One example of modulation scheme being quadrature amplitude modulation, QAM. The depicted representations are in no way the only possibilities since any set of hierarchical modulation and coding schemes, provided with different modulation order among its elements, may be used in the proposed method.

Having selected S1 such a hierarchy of modulation and coding schemes the method proceeds and identifies S2, based on the selected schemes, two sets of data, a first set of data and a second set of data. The first set of data may comprise the complete information content of the digitally encoded data, or at least a significant part of the information content of the digitally encoded data. The second set of data constitutes a sub-set of the first set of data. That is, all the content of the second set of data is comprised in the first set of data. The difference between the first and second set of data is that the latter does not contain the most robust bits of the former. The particular method step may therefore, in a particular example, alternatively be viewed as identifying the most robust bits of the first data set and identifying a second data set that is identical to the first data set with the exception that the most robust bits of the first data set is lacking in the second data set.

The method then proceeds and performs S3 a modulation and coding of the first set of data. This is done using a modulation and coding scheme with high order modulation. The modulated and coded first set of data is then used to create a first layer of the data packet. The purpose of this is to ensure that a communication unit that receives the data packet with good channel quality needs to demodulate and decode only the first layer to get hold of the information content. A communication unit with bad channel quality may on the other hand demodulate and decode the data packet to obtain at least the most robust bits of the first data set.

The method also performs S4 a modulation and coding of the second set of data. This is however done using a modulation and coding scheme with a modulation order that is lower than the modulation order used to modulate and code the first set of data, that is, the high order modulation. This is done to ensure that a communication unit that receives the data packet with bad channel quality can demodulate and decode the second layer to obtain the information content modulated by using the low order modulation. The receiving communication unit with bad channel quality will in this way be provided with information content from the first set of data, i.e. the most robust bits of the first set of data, and information content from the second set of data. The complete content of the data packet may thus be obtained by combining the information content from the first set of data with the information content from the second set of data. It should be noted that the identified second set of data may be partitioned into further subsets in the same way as has been described. In this way it will be possible to create a large number of layers of the data packet, where each layer has been modulated and coded using a modulation and coding scheme with a specific modulation order. As an example, consider portioning the second subset into still other subsets, e.g. into a third subset. The third subset will contain the complete information content of the second subset, with the exception of the most robust bits of the second subset. The content of the third subset will now be modulated and coded using a modulation and coding scheme having an order of modulation that is lower than the one used to modulate the content of the second data subset. In this way a third layer of the data packet will be created. This particular partitioning may be continued until a large number of layers are created. One may for example begin with a specific high order modulation, such as e.g. 64 QAM, and then reduce the modulation order one step in every layer, this may continue until the use of binary modulation in a layer, e.g. BPSK.

To further illustrate the proposed method we provide a particularly simple example that relates to the case of broadcasting a data packet with two layers. A first layer where the first set of data was modulated using a high order modulation scheme in the form of 64-QAM. And a second layer comprising a second set of data modulated by using low order modulation, e.g., BPSK. In the beginning of the data packet there is a first layer modulated and coded with a high order modulation. This may for example be done using a modulation scheme represented by a constellation mapping such as in FIG. 12b, e.g., 64-QAM, 64-Quadrature Amplitude Modulation. Communication units with good channel conditions can decode the full data using this part. Communication units with poor channel conditions can use this part to decode parts of the data, e.g. the most robust bits of the first layer. After the first layer, modulated with the high order modulation, a second part, or layer, with low order modulation, e.g., BPSK—Binary Phase Shift Keying, follows. The receiving communication unit with poor channel conditions may use this layer to decode the rest of the data. Specifically, the data that in the first layer of the packet were transmitted in least reliable bits are once again transmitted in the second part of the packet, but this time using a robust modulation and coding scheme, MCS. In summary, only the first layer of the data packet is necessary for communication units with good channel quality, e.g. the high Signal to Noise Ratio, SNR, while the whole data packet is still useful for receiving communication units with bad channel quality, e.g. low SNR. It should be noted that the approach is equally efficient if the transmission is intended for a single receiver, i.e. unicast transmission, instead of broadcasting but where the transmitter does not know what MCS to use. By utilizing the described method providing various differently modulated and coded layers the receiving communication unit will be able to demodulate and decode different layers in order to obtain the complete content of the data packet.

According to a particular embodiment, briefly mentioned above, of the proposed technology there is provided a method wherein the first set of data comprises the complete content of the digitally encoded information whereby the created first layer of the data packet comprises the complete modulated and coded content of the digitally encoded information.

According to a particular embodiment of the proposed technology there is provide a method, wherein the step of identifying S2 the second set of data also comprises to determine subsets of the second set of data, each subset comprising bits of information of a specified robustness level, and wherein the step of performing S4 modulation and coding of the second set of data comprises to modulate and code each individual subset of the subsets using a modulation and coding scheme that is adapted to the specific level of robustness in order to create a number of additional layers of the data packet, each of the modulation and coding schemes used to modulate the subsets are more robust than the modulation order of the modulation and coding scheme used to modulate and code the first set of data.

It should be noted that herein modulation and coding schemes that are considered robust corresponds to modulation and coding schemes that have a low order of modulation. Hence a particular modulation and coding scheme that is considered to be more robust than another modulation and coding scheme could equally well be considered to have lower order modulation than the other modulation and coding scheme.

This particular embodiment relates to the case where identified S2 second set of data is partitioned into further subsets. In this way it will be possible to create a large number of layers of the data packet, where each layer has been modulated and coded using a modulation and coding scheme with a specific modulation order. As an example, consider portioning the second subset into still other subsets, e.g. into a third subset. The third subset will contain the complete information content of the second subset, with the exception of the most robust bits of the second subset. The content of the third Subset will now be modulated and coded using a modulation and coding scheme having an order of modulation that is lower than the one used to modulate the content of the second data subset. In this way a third layer of the data packet will be created.

By way of example, the proposed technology provides a method that also comprises to concatenate the first layer and the at least one additional layer in order to create a data packet with a chain of data packet layers. The concatenation of the layers could, according to a particular embodiment, be performed in either the frequency domain or in the time domain, or in both.

Yet another exemplary embodiment of the proposed technology provides a method that also comprises adding a preamble to the modulated and coded data packet.

An efficient embodiment of the proposed technology provides a method wherein the preamble comprises at least one of the following:

information providing details on how the layers of the data packet was modulated and coded, information relating to the amount of data contained in the data packet.

By incorporating this information into the preamble of the data packet it is ensured that a potential receiving device quickly can extract information relevant for demodulation and decoding of the various layers as well as to extract information that may be used to ensure that all information was successfully demodulated and decoded.

The described method relates to a method for modulating and coding a data packet comprising digitally encoded information. This data packet could for example be a data packet to be transmitted in a wireless communication network. The data packet may however also be modulated and coded for transmission in other networks, such as peer-to-peer networks.

The earlier described method pertain to a method for modulating and coding a data packet comprising digitally encoded information. The proposed technology also pertain to a complementary method for transmitting data packets modulated and coded as described.

Figure 2:
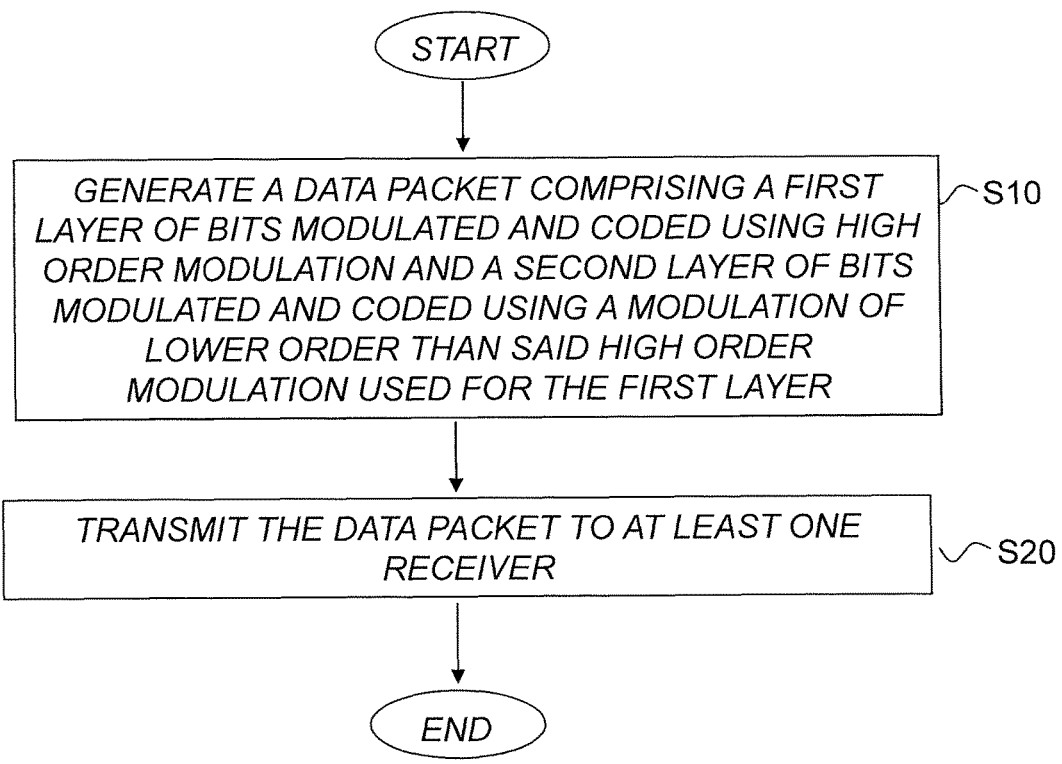
FIG. 2 is a flow diagram illustrating a transmitting method according to the proposed technology.

According to this complementary aspect of the proposed technology there is provided a method for transmitting data packets comprising digitally encoded information. FIG. 2 is a schematic flow diagram illustrating an example of such a method. The method comprises generating S10 a data packet, the data packet comprising a first layer of bits being modulated and coded through a modulation and coding scheme with high order modulation, the data packet also comprising at least one additional layer comprising bits of information different from the most robust bits of the first layer, the bits forming the at least one additional layer being a subset of the bits forming the first layer, and where the bits of each of the at least one additional layers have been modulated and coded using a modulation and coding scheme having a modulation order that is lower than the high order modulation of the modulation and coding scheme used to modulate and code the first layer. The method also comprises transmitting S20 the data packet to at least one receiver to enable the receiver to select the particular layers to demodulate and decode in order to obtain the complete content of the data packet.

The data packet may therefore be generated S10 by partitioning the bit content of the data packet into layers. A first layer, containing most if not all of the information content that is created by modulating and coding the bits by using a high order modulation scheme, and at least one additional layer. The bit content of the additional layer(s) comprises a subset of the bits of the first layer. The difference in content, i.e. the difference between the sets, being that the most robust bits of the first layer is excluded from the second layer. The bits of the additional layer(s) have been modulated and coded using a modulation scheme with lower order than the modulation order of the modulation and coding scheme used to create the first layer.

A preferred embodiment of the proposed technology provides a method wherein the step of generating S10 a data packet further comprises selecting S11 a hierarchy of modulation and coding schemes to use for modulation and coding of the digitally encoded information. The step of generating S10 also comprises identifying S12, among the bits in the digitally encoded information and based on the selected hierarchy of modulation and coding schemes, two sets of data, a first set of data and a second set of data, the second set of data being a sub-set of the first set of data and comprising bits being different from the most robust bits of the first set of data. The step of generating S10 also comprises performing S13 modulation and coding of the first set of data using a modulation and coding scheme with high order modulation in order to create the first layer of the data packet. The step of generating S10 also comprises performing S14 modulation and coding of the second set of data by using at least one modulation and coding scheme from the hierarchy of modulation and coding schemes having a modulation order that is lower than the high order modulation, in order to create the at least one additional layer of the data packet.

Figure 3:
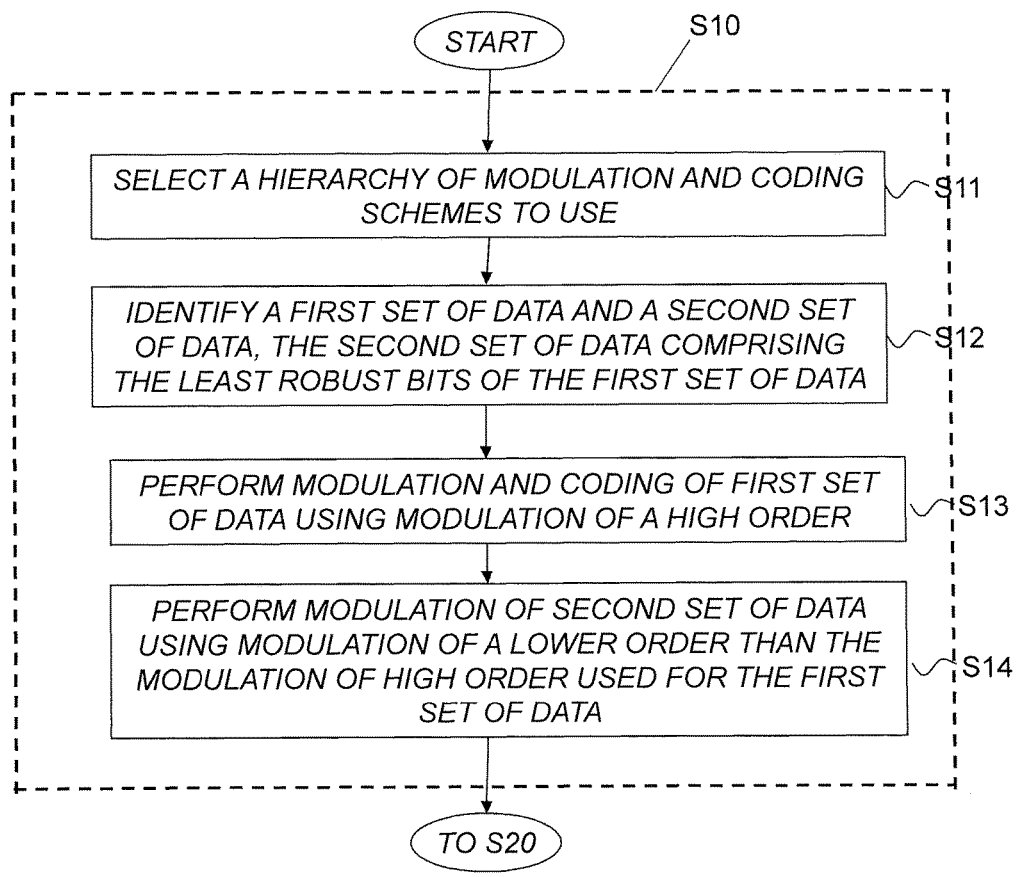
FIG. 3 is a flow diagram illustrating a particular embodiment of the transmitting method according to the proposed technology.

This particular embodiment is illustrated in the flow diagram of FIG. 3 and the particular way to generate the data packet corresponds to the earlier described method for modulating and coding digitally encoded information. The description of that particular aspect of the proposed technology is equally valid here and will not be repeated.

Still another embodiment provides a method wherein the bits of the first layer comprises the complete content of the digitally encoded information whereby the created first layer of the data packet comprises the complete modulated and coded content of the digitally encoded information.

Yet another embodiment of the proposed technology provides a method wherein the step of identifying S12 the second set of data also comprises to determine subsets of the second set of data, each subset comprising bits of information of a specified robustness level, and wherein the step of performing S14 modulation and coding of the second set of data comprises to modulate and code each individual subset of the subsets using a modulation and coding scheme that is adapted to the specific level of robustness in order to create a number of additional layers of the data packet, each of the modulation and coding schemes used to modulate the individual subsets are more robust than the high order modulation of the modulation and coding scheme used to modulate and code the first set of data.

This particular embodiment has been described earlier with regard to the method for modulating and coding digitally encoded information and will not be repeated By way of example, the proposed technology provides a method wherein the step of generating S10 a data packet also comprises to concatenate the first layer and the at least one additional layer in order to create a data packet with a chain of data packet layers.

A particular embodiment of the proposed embodiment provides a method wherein the concatenation of the layers is performed in either the frequency domain or in the time domain, or in both.

According to an efficient embodiment of the proposed technology there is provided a method wherein the step of generating S10 a data packet also comprises adding a preamble to the modulated and coded data packet.

Another embodiment that provides for a highly efficient communication relates to a method wherein the preamble comprises at least one of the following:
  information providing details on how the layers in the data packet was modulated and coded,
  information relating to the amount of data contained in the data packet.

According to a possible embodiment of the proposed method is the data packet to be transmitted in a wireless communication network.

An exemplary embodiment of the method provides a method wherein the step of transmitting S20 the data packet comprises to broadcast or multicast the data packets to more than one receiver to enable receivers with favorable receiver conditions to obtain the information comprised in the data packet by demodulating and decoding only the first layer, and to enable receivers having less favorable receiver conditions to obtain the information by demodulating and decoding both the first layer and the at least one additional layer.

An alternative exemplary embodiment of the proposed method provides a method wherein the step of transmitting S20 the data packet comprises to transmit the data packet to a target receiver having largely unknown receiver conditions, to enable a receiver with favorable receiver conditions to obtain the information by demodulating and decoding only the first layer, and to enable a receiver having less favorable receiver conditions to obtain the information by demodulating and decoding both the first layer and the at least one additional layer.

The earlier described methods provides a way for a transmitting device to generate data packets and transmit them to a receiving device, i.e. a communication unit. The proposed technology also provides mechanisms whereby a receiver of the data packet may demodulate and decode the data packet.

Figure 4:
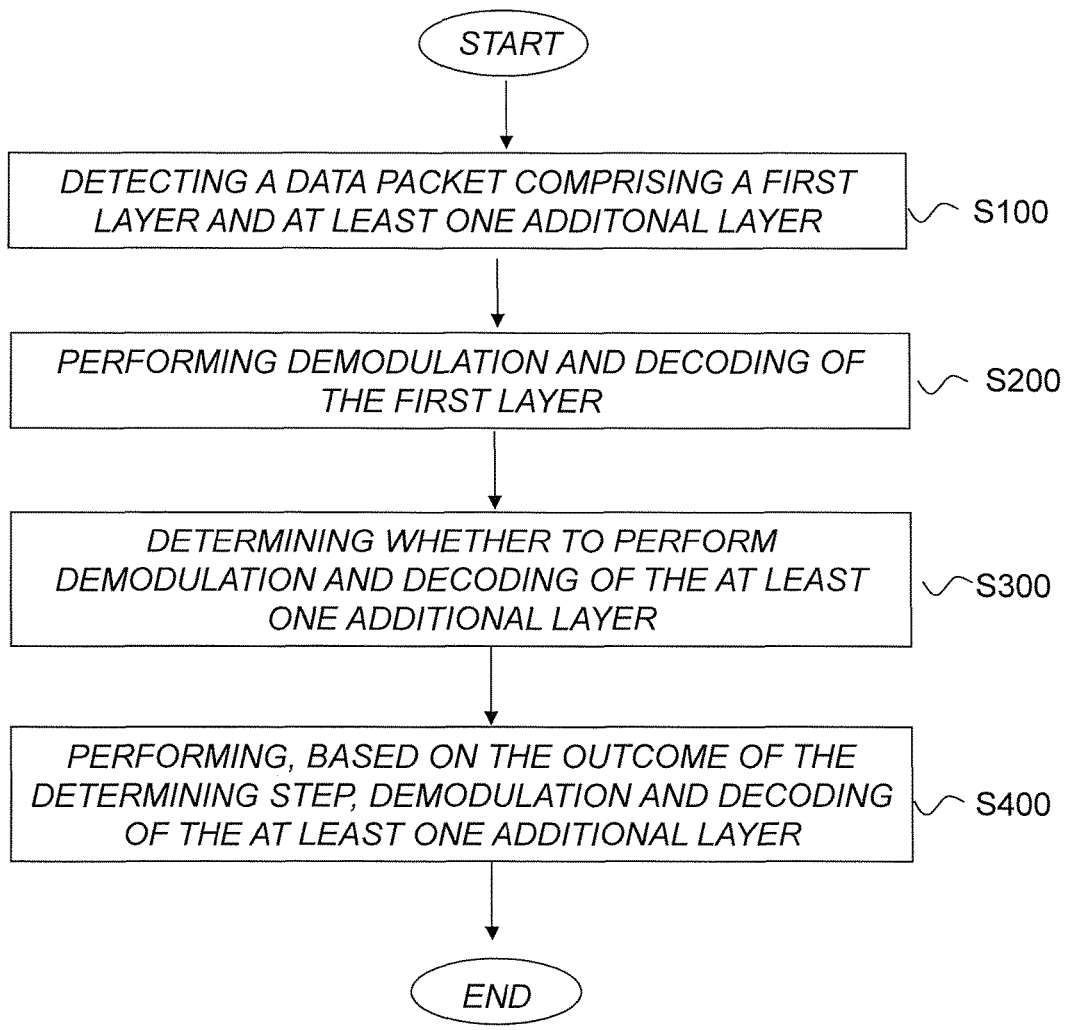
FIG. 4 is a flow diagram illustrating a complementary method for demodulating and decoding a data packet modulated and coded according to a particular aspect of the proposed technology.
Figure 5:
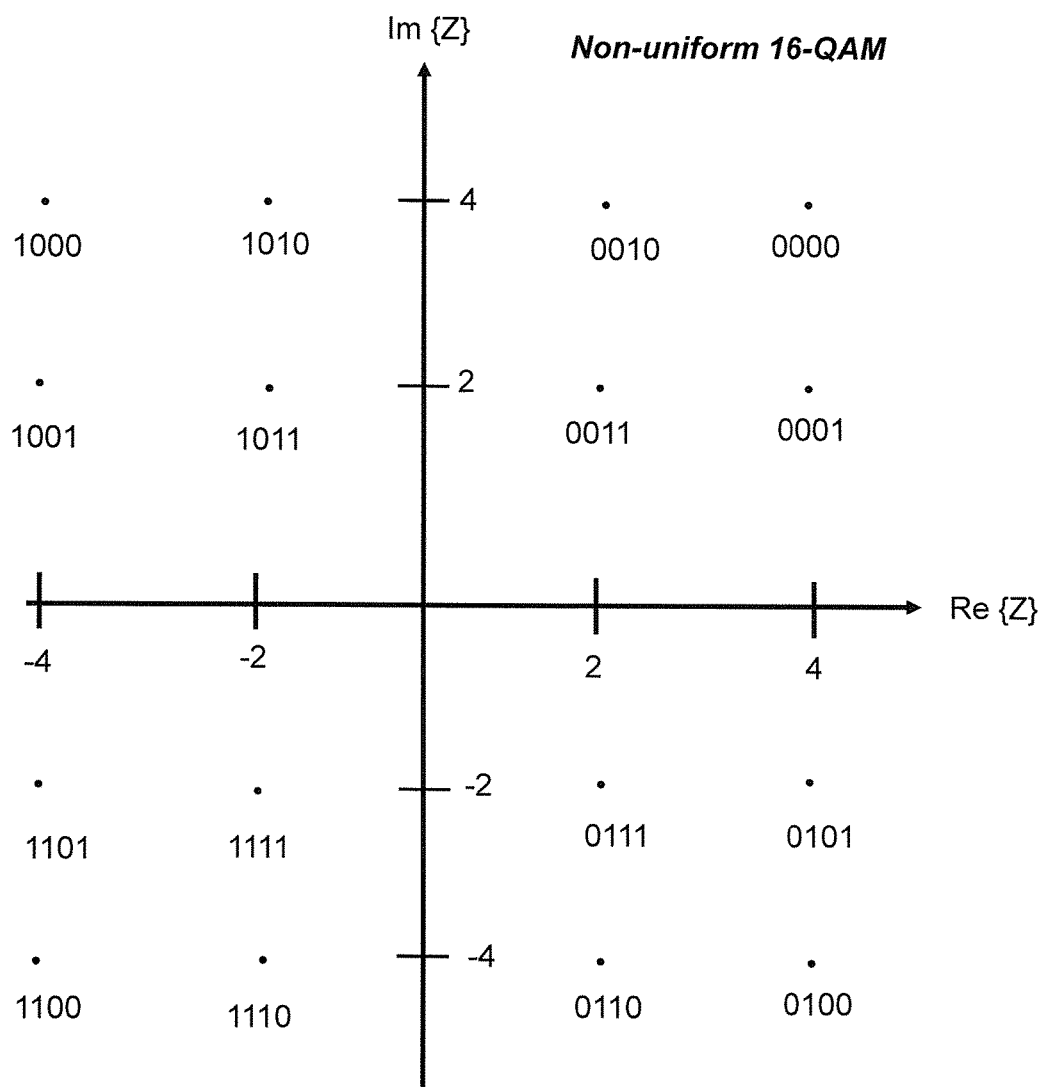
FIG. 5 provides an illustration of a constellation mapping for Non-uniform 16-QAM where the distance between the constellation points within the same quadrant is half the minimum distance between the constellation points belonging to different quadrants.

It is therefore provided a method for demodulating and decoding information in a data packet comprising digitally encoded information. FIG. 4 is a schematic flow diagram illustrating an example of such a method. The method comprises detecting S100 a data packet, the data packet comprising at least two layers, a first layer comprising a first set of data with bits modulated and coded using a modulation and coding scheme with high order modulation, and at least one additional layer comprising a second set of data with bits modulated and coded using a modulation and coding scheme with a modulation order lower than said high order modulation, the second set of data being a subset of the first second set of data and comprising bits different from the most robust bits of the first set of data. The method also comprises performing S200 demodulation and decoding of the first layer of the data packet. The method also comprises the step of determining S300 whether to perform demodulation and decoding of the at least one additional layer. The method also comprises performing S400, based on the outcome of the determining step S300, demodulation and decoding of the at least one additional layer in order to retrieve the information carried by the bits in the second set of data.

A possible embodiment of the proposed method provides a method wherein the bits of the first layer comprises the complete content of the digitally encoded information whereby the created first layer of the data packet comprises the complete modulated and coded content of the digitally encoded information.

According to a particular embodiment of the proposed technology there is provided a method wherein the data packet also comprises a preamble, the preamble comprising at least one of the following:
  information providing details on how the layers of the data packet was modulated and coded,
  information relating to the amount of data contained in the data packet,
  wherein the step of performing demodulation and decoding S200, S400 of the first layer and second layer of the data packet is based on the information in the preamble.

Another embodiment of the proposed technology provides a method wherein the step of determining S300 whether to perform demodulation and decoding of the at least one additional layer is based on information comprised in the preamble.

A particular version of the proposed technology provides a method wherein the step of determining S300 whether to perform demodulation and decoding of the at least one additional layer is based on a comparison of the quality of the detected data packet and a pre-determined threshold.

In other words, a receiving communication unit implementing the proposed method may detect the data packet and register certain relevant signal quality measures such as signal to noise ratio, SNR, and compare this measure with a pre-determined threshold. If, for example, SNR is below a certain set threshold, the communication unit may decide that it should perform demodulation and decoding of the first layer as well as the additional layers.

An alternative embodiment provides a method wherein the step of determining S300 whether to perform demodulation and decoding of the at least one additional layer comprises to compute a Cyclic Redundancy Check, CRC, for the first layer and determine that a demodulation and decoding of the at least one additional layer is to be performed if the checksum of the Cyclic Redundancy Check is not correct.

In other words, a receiving communication unit implementing the proposed method demodulates and decodes the first layer of the data packet. It then computes the CRC corresponding to the first layer and if the result of the computation is not what was expected it proceeds and demodulates and decodes at least one additional layer. This may be repeated for as many layers as contained in the data packet and the proceeding may be terminated when the CRC sum is correct.

Having described the methods of the proposed technology in great detail, in the following we will provide some examples of the various aspects of the complementary methods. These examples are merely intended to illustrate the working principles of the proposed technology and should not be construed as providing limitations on the same. Below the term constellation mapping or constellation diagram will be used interchangeably with modulation scheme, see earlier discussion.

A particular feature of the proposed technology is to exploit that some bits in a particular modulation and coding scheme, represented by a constellation mapping can be received more reliable than other bits. Which bits can be exploited in such way depends on the specific constellation mapping. Designing a constellation mapping having even larger difference in reliability for the different bits, one may employ non-uniform constellations in a similar way as in hierarchical modulation and SOMA. Regardless of how the difference in reliability is achieved, the idea is that the least reliable bits are re-sent later in the packet, but this time using a modulation and coding scheme that provides increased robustness, i.e. using a lower order of modulation.

To describe this particular feature, suppose that K information bits are encoded into N coded bits by means of a forward error correcting code, FEC code, e.g. a block code or a convolutional code. A block code may e.g. be a BCH code, but it may also be a low density parity check code, LDPC code.

Typically, the encoder is binary, i.e. the output sequence consists of zeros and ones. To increase the spectrum efficiency of a communication system the bits are often grouped together and then transmitted using M-ary modulation. Typically $M=2^k$, where k is the number of bits mapped to each M-ary symbol, and M is the size of the signal constellation. Typical values for M are 4, 16, 64, and 256, corresponding to k=2, 4, 6, and 8.

As the packet formatting and the mapping used are of certain importance in the proposed technology, a specific example suitable for an implementation will be provided. The purpose of the packet formatting, i.e. partitioning the data packet into layers, and potentially a preamble, is to make it possible for a receiving communication unit 300 having good channel condition to obtain the information in the packet as quickly as possible, and in this way be able to turn off and save power. At the same time, a receiving communication unit 300 with poor channel conditions should still be able to receive the data, although the receiving communication unit 300 may have to be in receiving mode for a longer time, and may have to process the entire data packet, i.e. the first layer as well as the additional layers. This is schematically illustrated in FIG. 14c, where a packet structure in accordance with the proposed technology is depicted. All receiving communication units 300 may process a potential preamble of the data packet first. Here, the preamble could, for instance, consist of known signals used for time and frequency synchronization as well as for channel estimation. The preamble may in this context also include control information necessary for demodulation and decoding of the subsequent data following in the packet. Example of such information may be what type of modulation and coding is used for the subsequent data and the amount of data contained in the data packet. Specifically, the preamble may contain information regarding different options to obtain the information in the packet depending on whether the receiving communication units' 300 conditions are favourable or not, for instance, by including a certain threshold on the received signal's quality. Referring to FIG. 14c, the data may be formatted in a way such that a receiving communication unit with favourable receiver condition may be able to obtain the information using only the first part, or first layer, of the packet, whereas a receiving communication unit 300 with less favourable receiver conditions may have to combine the information obtained from the first and the second part of the packet in order to extract the information.

Another particular part of the invention is to transmit the coded data in such way that that receiving units 300 in an effective way can explore when the receiver conditions are good and then perform the decoding quicker. According to the proposed technology, this is achieved by sending part of the coded information both in the first layer of the data packet and in the second layer of the data packet. To further elaborate on how this may be done, consider FIG. 6a and FIG. 6b. During the first part of the packet, non-uniform 16-QAM is used. As it is seen from FIG. 6a, of the four bits represented by each constellation point, the two most significant bits, MSBs, the two first ones, are the same within each quadrant, whereas the two least significant bits, LSBs, are different within each quadrant. Thus, it is readily seen that the two MSBs are much more reliable as the distance from any of the points to another point where the two MSBs are different is much larger than the distance to a point where the at least one of the two LSBs is different. Thus, a receiving communication unit 300 with poor receiver conditions may only be able to use the two MSBs, whereas a receiving communication unit with good channel conditions may be able to use all four bits.

Figure 6A:
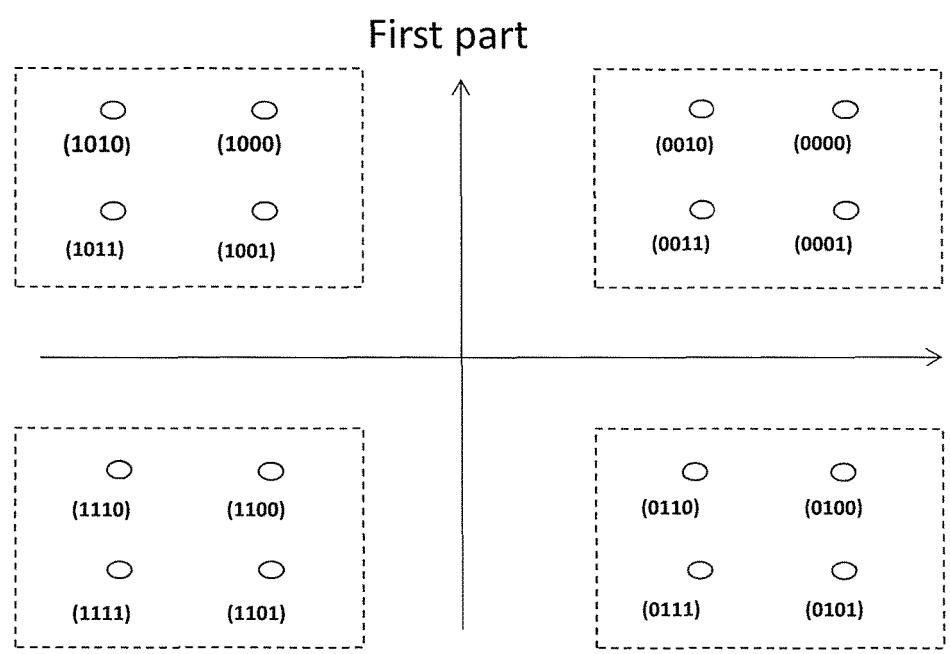
FIG. 6a provides an illustration of a constellation diagram representing a modulation scheme used for a first set of data according to a particular embodiment of the proposed technology.
Figure 6B:
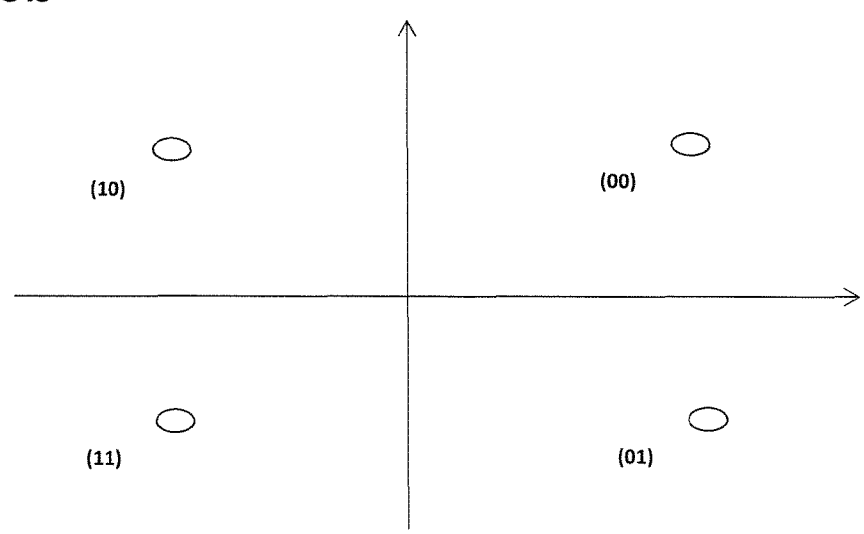
FIG. 6b provides an illustration of a constellation diagram of a modulation scheme used for a second set of data according to a particular embodiment of the proposed technology FIG. 7 provides a schematic illustration of a transmitter according to prior art.

To allow also the receiving communication unit 300 with poor channel conditions to receive the data, the less reliable bits during the first part of the packet are transmitted also during the second part of the packet, but this time the bits are transmitted using a more robust format, which allows also receivers with poor channel conditions to use them in an effective way. This is illustrated in FIG. 6b, where the bits that during the first part were sent as the LSBs, now are transmitted using ordinary QPSK. In this example, the packet consisted of two parts or layers. However, the same methods can be extended to three or more parts.

Figure 7:
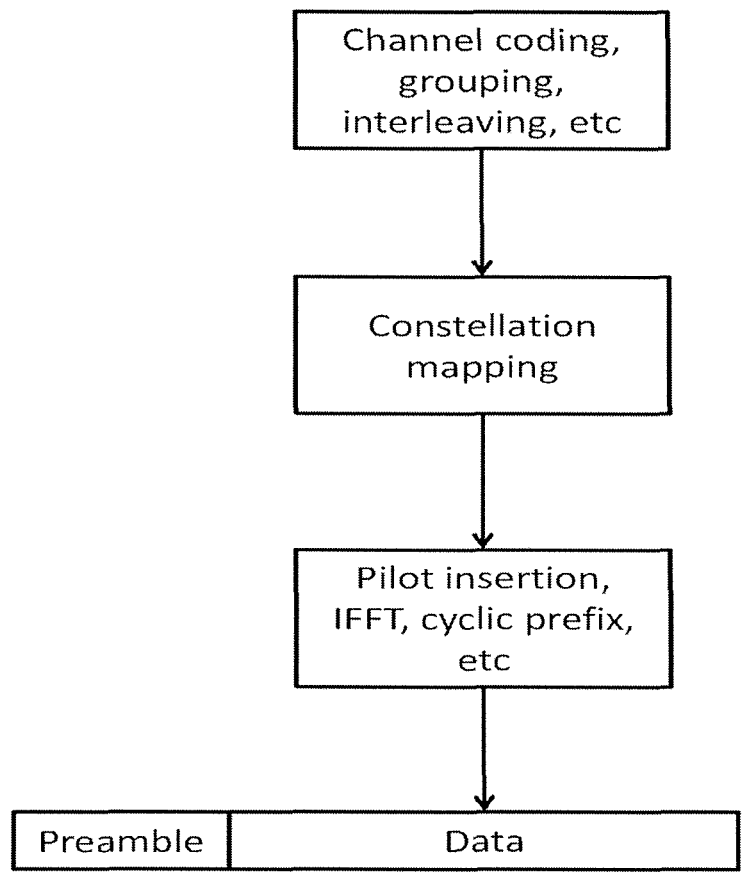
Figure 8:
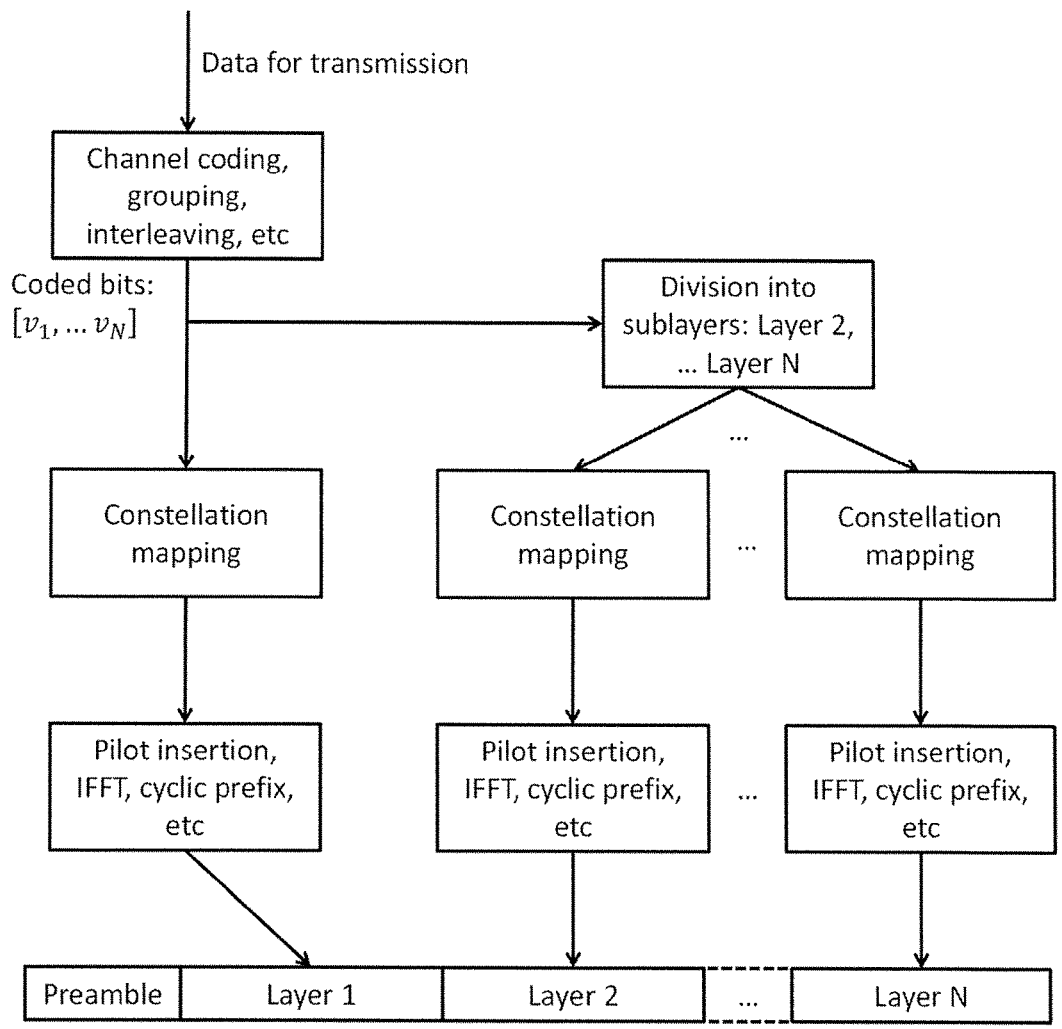
FIG. 8 provides an illustration of how coded bits may be partitioned and sent using different modulation and coding schemes in different parts/layers of the packet.

To describe the transmitter side in some more detail, consider the case that the system is using orthogonal frequency division multiplexing, OFDM. FIG. 7 shows a transmitter chain according to prior art. FIG. 8, shows how a transmitter chain using the proposed technology may look like. The coded data bits, ready for transmission comes from the traditional transmission chain. These bits are divided into N layers, where the first layer may correspond to a traditional packet formatting where a traditional constellation mapping is performed.

For layers 2, . . . , N, selected parts of the coded data bits may be further subdivided. The selection of bits to use for each layer is dependent on the constellation mapping of the other layers. Typically, for each layer n1>n2, less bits are chosen, but the opposite may also be true. We here provide one example of subdivision, using 3 layers. In the first layer, 64-QAM Gray mapping is used, see the constellation mapping of FIG. 12b. Each constellation symbol represents 6 bits: $u_1\ u_2\ u_3\ u_4\ u_5\ u_6$. From FIG. 12b, we note that $u_1\ u_2$ are the two most robust bits, while $u_3\ u_4$ are less robust, and $u_5\ u_6$ are least robust. We encode the full data in the first layer. This means that a receiving communication unit 300 capable of decoding the full 64-QAM can retrieve the full data from this part of the payload.

Figure 13A:
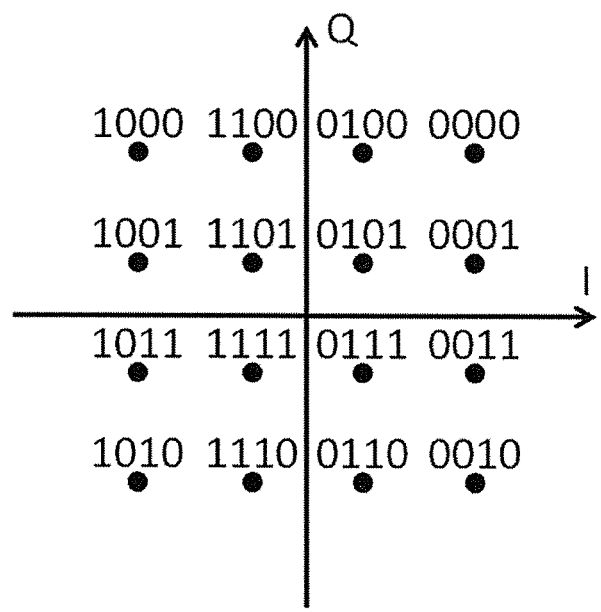
FIG. 13a provides an example of 16-QAM constellation diagram or constellation mapping.

In the second layer, 16-QAM Gray mapping is used, see constellation mapping of FIG. 13a. Each constellation symbol represents 4 bits: $v_1\ v_2\ v_3\ v_4$. From FIG. 13a, we note that $v_1\ v_3$ are the two most robust bits. Therefore we encode the least robust bits from layer 1, $u_5\ u_6$ to the most robust bits in layer 2, that is $[v_1\ v_3]=[u_5\ u_6]$, and we choose $[v_2\ v_4]=[u_3\ u_4]$. This means that a receiving communication unit 200 capable of decoding 16-QAM constellation may retrieve the full data by using layer 1 to find the bits $u_1\ u_2$ and layer 2 to find the bits $[u_3\ u_4\ u_5\ u_6]$.

Figure 13B:
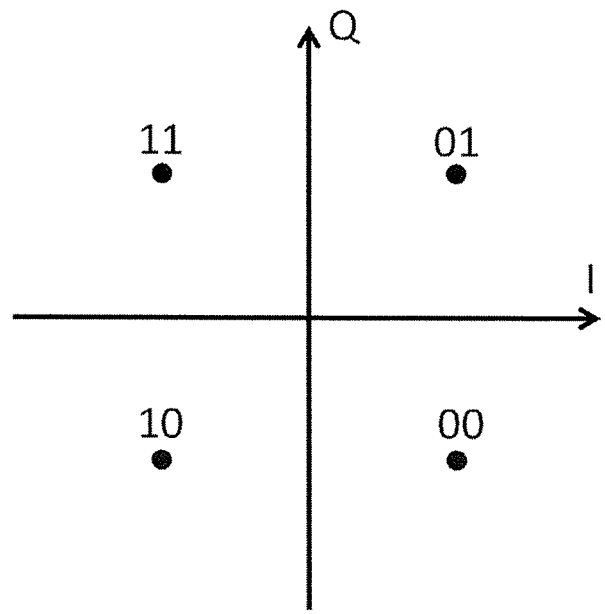
FIG. 13b provides an example of QPSK constellation diagram or constellation mapping.

In the third layer, QPSK Gray mapping is used, see constellation mapping of FIG. 13b. Each constellation symbol represents 2 bits: $w_1$ $w_2$. In general both these bits are equivalently robust, and we set them to represent the two weakest bits of the 16-QAM mapping of layer 2, that is [$w_1$ $w_2$]=[$v_2$ $v_4$]. Thus a receiving communication unit 300 capable of QPSK modulation may retrieve the full data by using layer 1 to find the bits $u_1$ $u_2$, layer 2 to find the bits [$v_1$ $v_3$]=[$u_5$ $u_6$], and layer 3 to find the bits [$w_1$ $w_2$]=[$v_2$ $v_4$]=[$u_3$ $u_4$].

It should be noted that other combinations than given above may be possible.

Figure 9:
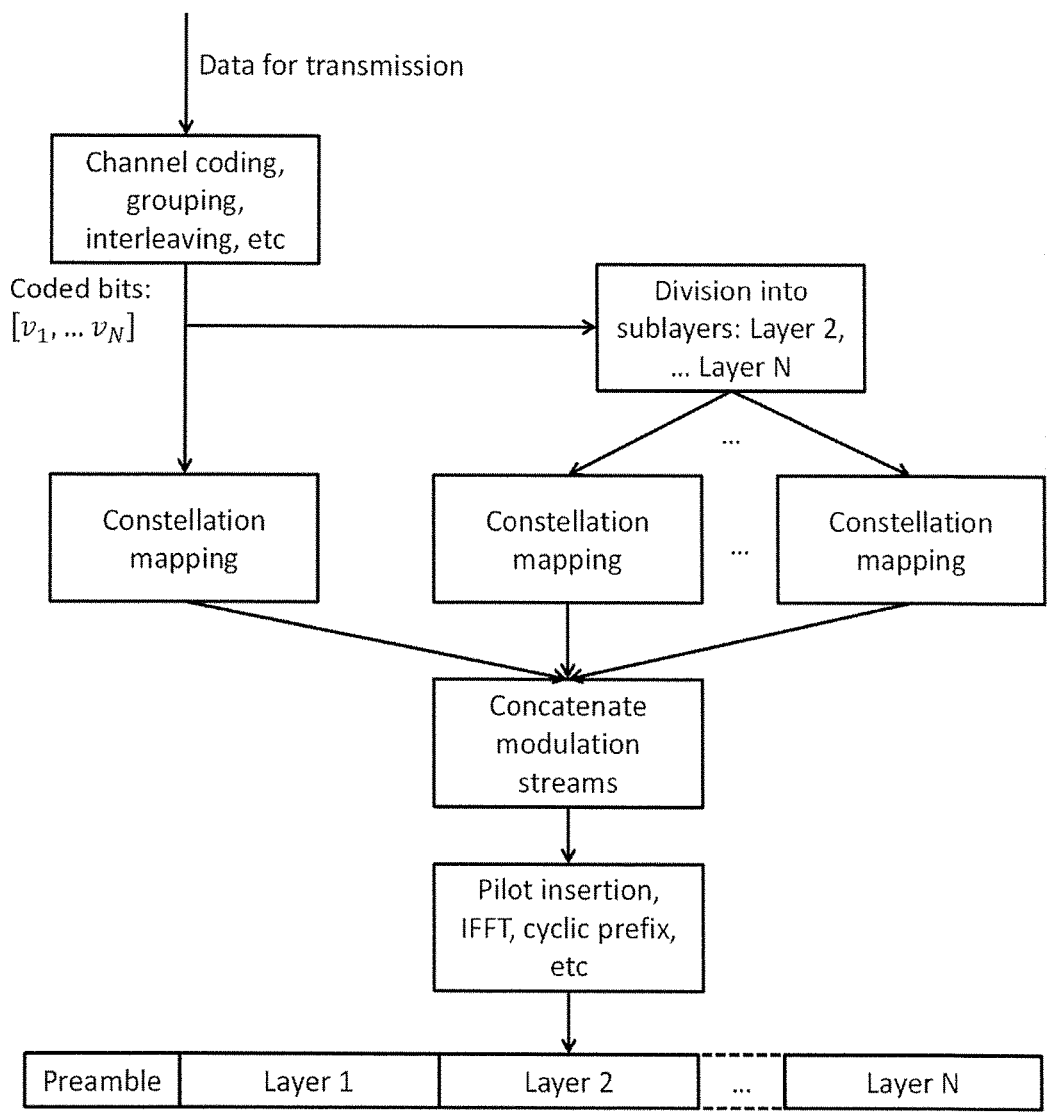
FIG. 9 provides an illustration of an alternative implementation of how the coded bits are partitioned and sent using different modulation and coding schemes in different parts/layers of the packet.

The output from the modulation scheme, or constellation mapping, for each layer is then progressed through a standard transmission chain forming time domain signals. These time domain signals are then optionally aggregated into one packet. We propose to signal the type of packet formatting in the preamble. An equivalent transmitter chain is presented in FIG. 9. In both these examples, we use the higher modulation order in the first part of the packet, but one can also use the modulation order in arbitrary order.

On the receiving side, there are two parts that impact how a multiple layered data packet according to the proposed technology might be decoded:
1) The highest modulation order the unit is capable to decode
2) The number of layers that a transmission consist of, and what modulation orders are available in the different layers.

Information relating to 2) above may, for example, be obtained through signaling in the preamble. Information regarding 1), can for example be discovered by means of trial-and-error, i.e., trying to decode and see if check sum checks out, or it can be estimated using for example SNR estimate over the preamble. Number 1) may also be dependent on complexity capabilities of the receiver.

Figure 10:
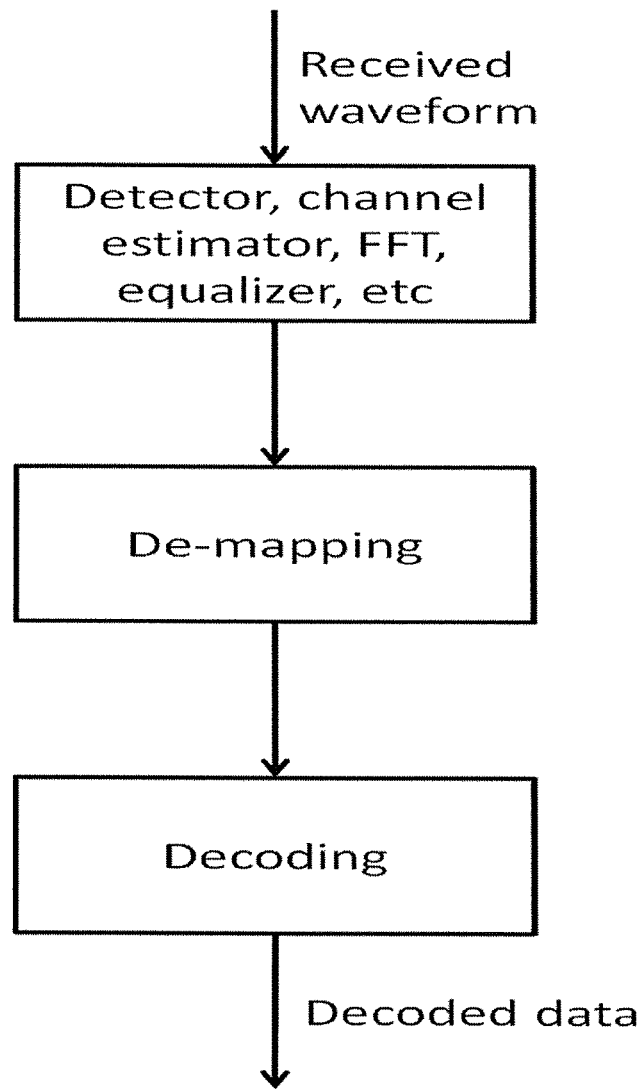
FIG. 10 provides a simplified illustration of an OFDM receiver chain according to prior art.
Figure 11:
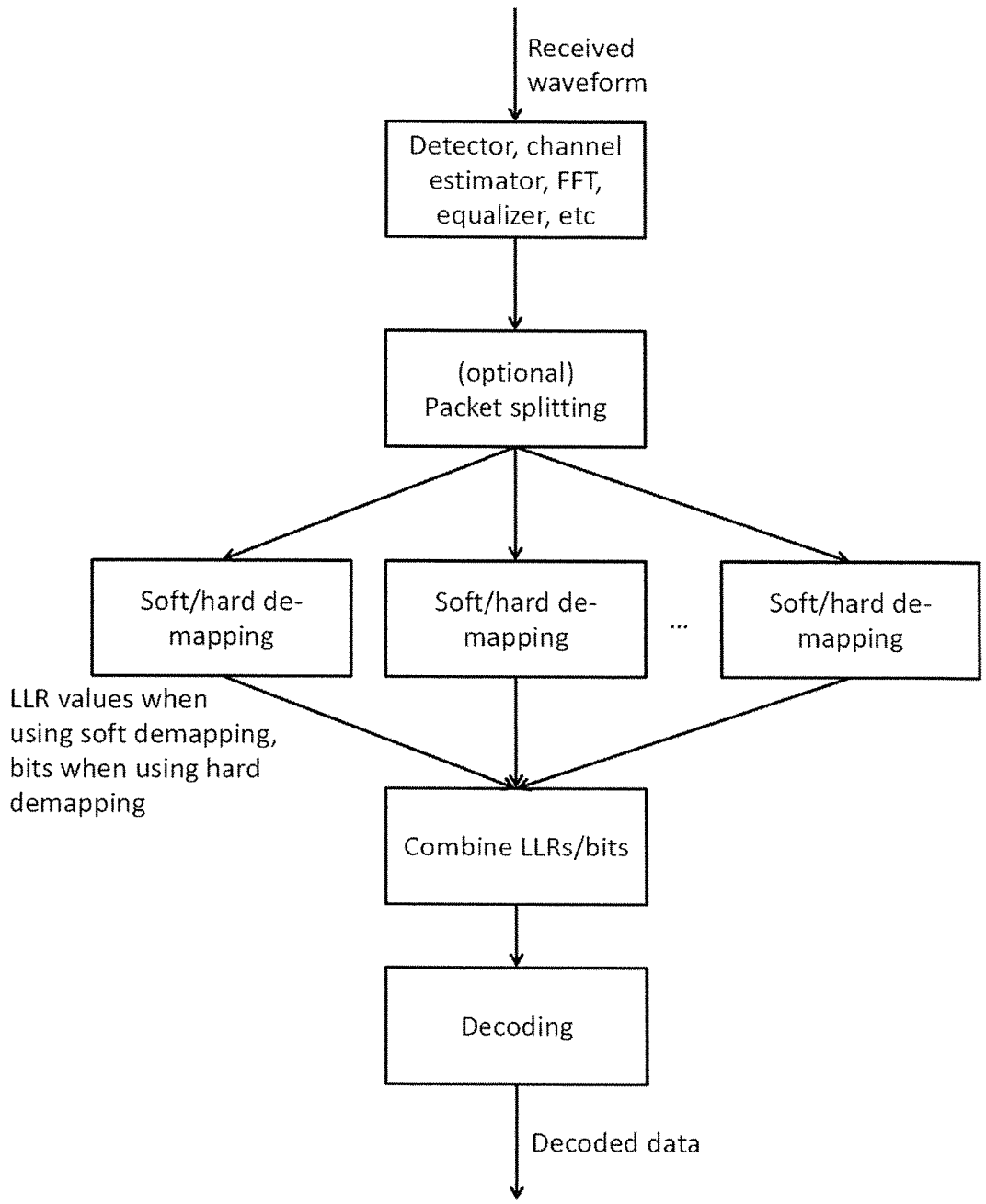
FIG. 11 provides a flow diagram illustrating a particular example of the demodulating and decoding method according to the proposed technology.

We now depict one alternative of receiver chain according to the proposed technology and illustrated in FIG. 11, the receiver chain may be contrasted with a receiver chain according to prior art illustrated in FIG. 10. The packet is detected and processed similar to the standard receiver chain until the de-mapper. There, the packet may be split, in order to de-map different parts of the packet with different de-mappers. Note that for any part of the packet using X-QAM modulation, where X is some number, 4, 16, 64, . . . , we might use a de-mapper for Y-QAM modulation, where Y<=X.

In the next example two different receiving communication units are considered and the data packet format is the format illustrated in FIG. 14c. One receiving communication unit uses QPSK demapping for the whole data packet and the other receiving communication unit, considered to have good SNR, uses 16QAM demapping. The latter can finish the processing after just the first part. The general case for N layers can be seen in FIG. 11. Note that the receiving communication unit that is finished after the first layer will be able to go to sleep early and save power.

Note that it is possible to consider a receiving communication unit attempting, without success, to decode the first layer using 16QAM. When the receiving unit discovers that decoding failed, e.g. by noting that the CRC computation does not check out, it may use layer 2 to improve the LLR values and attempt a new decoding. In that sense the proposed technology may also works as an adaptive rate.

Figure 12A:
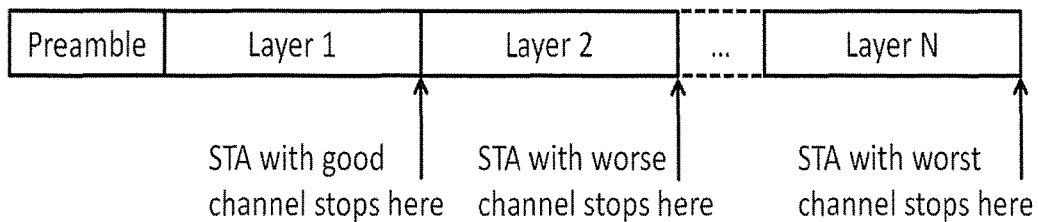
FIG. 12a provides an illustration of how much of a packet a communication unit needs to process depending on channel conditions.
Figure 12B:
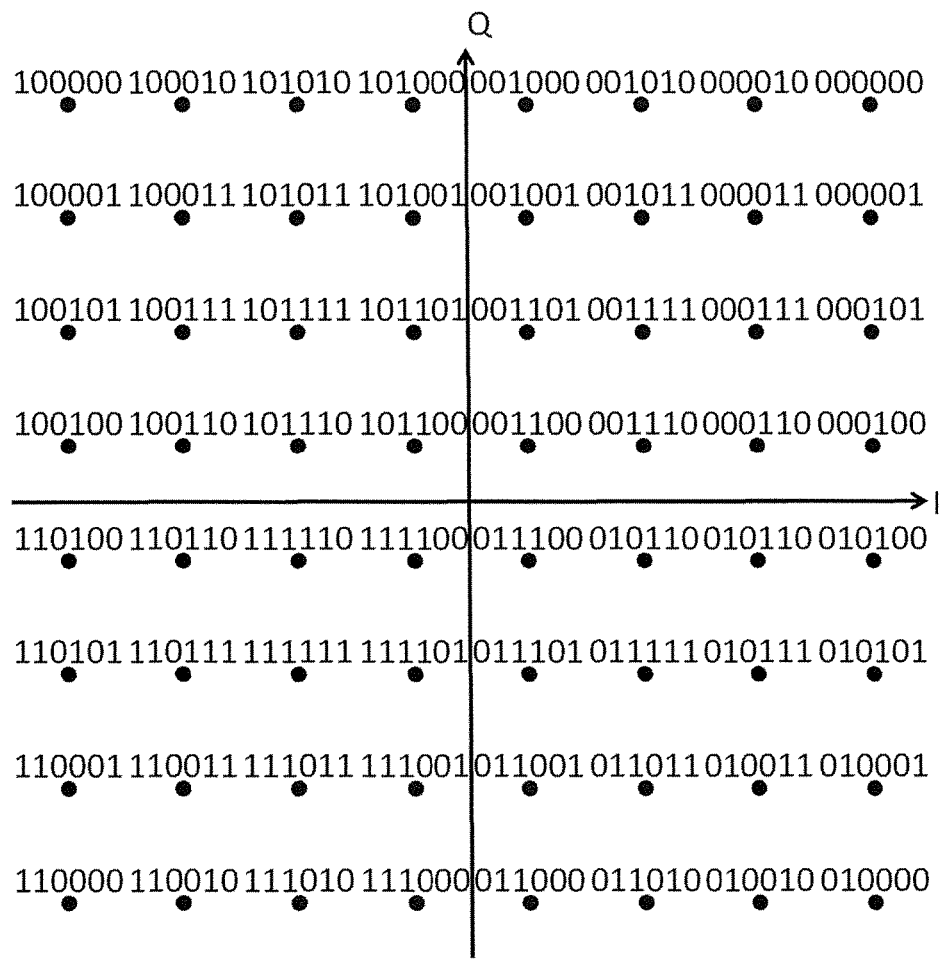
FIG. 12b provides an example of 64-QAM constellation diagram or constellation mapping.

The next example describe a first embodiment where data packet layers are sent subsequently in time. In this embodiment, the approach illustrated above is used in time as illustrated e.g. in FIG. 12a, allowing receiving communication units with good channel conditions to receive the data in a shorter period of time.

Another exemplary embodiment relates to the case where data packet layers are sent subsequently in frequency.

Figure 14A:
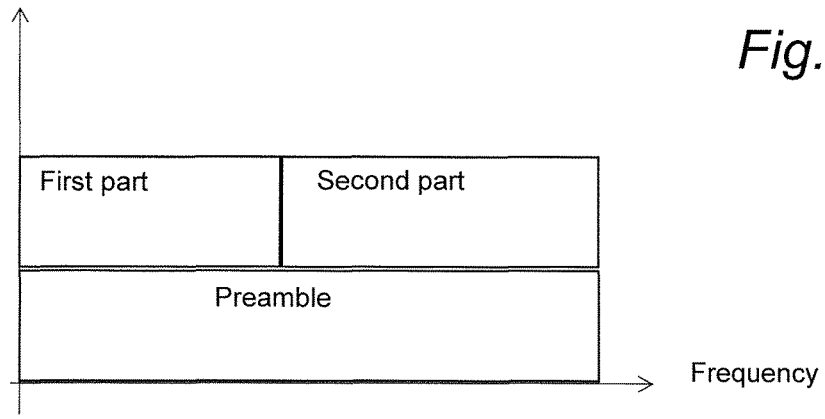
FIG. 14a provides a schematic illustration of a data packet generated according to the proposed technology, here illustrated in a time-frequency diagram.
Figure 14B:
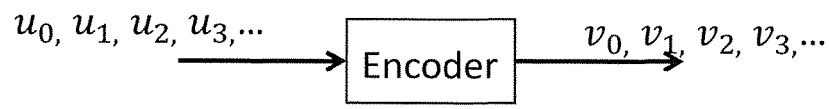
FIG. 14b provides a schematic illustration of a Forward Error Correcting encoder FIG. 14c provides a schematic illustration of how a data packet modulated and coded according to the proposed technology can be utilize by receiving communication units.
Figure 14C:
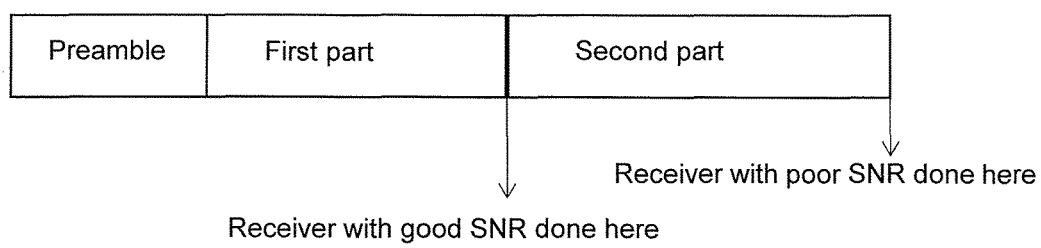

In this exemplary embodiment, the approach described above is used in frequency, as illustrated in FIG. 14a. In this case a receiving communication unit with good channel conditions may only need to process the left part of the signal corresponding to the first part of the packet, whereas a receiving communication unit with poor channel conditions may need to process the full bandwidth. It may be implemented such that the all receiving communication units process the full bandwidth during the reception of the preamble, but it may also be implemented such that sufficient information in the preamble can be obtained by only processing the same bandwidth as the first part of the data, i.e., a receiving communication unit with good channel condition may process the entire packet using the smaller bandwidth.

Having described the proposed complementary methods as well as providing examples of the overall working principals of the proposed technology, we will in the following describe devices, apparatuses and computer programs that are suitable to perform the described methods. To this end, the term "network device" as used herein may refer to any device located in connection with a communication network, including but not limited to devices in access networks, core networks and similar network structures. The term network device may also encompass cloud-based network devices. Furthermore, the general non-limiting term "communication unit", as used herein includes network nodes and/or associated wireless devices.

The non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may in turn refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

The various devices described in what follows are thus suitable devices to perform the earlier described methods. The advantages achieved with these particular devices are the same as the ones described with regard to the corresponding methods and the advantages will not be repeated.

The proposed technology provides a network device 100 configured for modulating and coding a data packet comprising digitally encoded information. The network device 100 is configured to select a hierarchy of modulation and coding schemes to use for modulation and coding of the digitally encoded information. The network device 100 is also configured to identify, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data. The network device 100 is also configured to perform modulation and coding of the first set of data using a modulation and coding scheme with high order modulation in order to create a first layer of the data packet. The network device 100 is also configured to perform modulation and coding of the second set of data by using at least one modulation and coding scheme from the hierarchy of modulation and coding schemes having a modulation order that is lower than the high order modulation, in order to create at least one additional layer of the data packet.

The proposed technology also provides an embodiment of a network device 100 wherein the first set of data comprises the complete content of the digitally encoded information whereby the created first layer of the data packet comprises the complete modulated and coded content of the digitally encoded information.

The proposed technology also provides an embodiment of a network device 100 wherein the network device 100 is further configured to determine subsets of the second set of data, each subset comprising bits of information of a specified robustness level, and configured to perform modulation and coding of the second set of data by modulating and coding each individual subset of the subsets using a modulation and coding scheme that is adapted to the specific level of robustness in order to create a number of additional layers of the data packet, each of the modulation and coding schemes used to modulate the subsets are more robust than the modulation order of the modulation and coding scheme used to modulate and code the first set of data.

The proposed technology also provides an embodiment of a network device wherein the network device 100 is also configured to concatenate the first layer and the at least one additional layer in order to create a data packet with a chain of data packet layers.

The proposed technology also provides an embodiment of a network device 100 wherein the network device 100 is configured to perform concatenation of the layers in either the frequency domain or in the time domain, or in both.

The proposed technology also provides an embodiment of a network device 100 wherein the network device 100 is further configured to add a preamble to the modulated and coded data packet.

The proposed technology also provides an embodiment of a network device wherein the preamble comprises at least one of the following:
information providing details on how the layers of the data packet was modulated and coded,
information relating to the amount of data contained in the data packet.

The proposed technology also provides an embodiment of a network device 100 wherein the network device is configured to modulate and code a data packet to be transmitted in a wireless communication network.

Figure 15A:
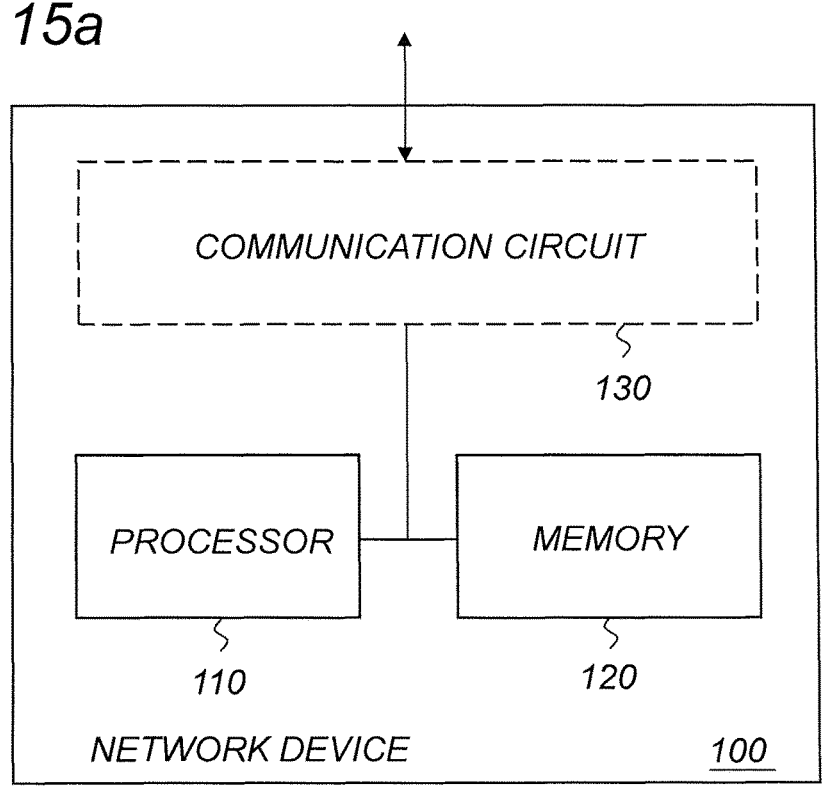
FIG. 15a is a block diagram illustrating an embodiment of a network device according to the proposed technology.

A particular embodiment of the network device 100 is illustrated in FIG. 15a. FIG. 15a is a block diagram illustrating a network device 100 that comprises a processor 120 and a memory 130, the memory 130 comprising instructions executable by the processor 110, whereby the processor 120 is operative to generate a data packet comprising a first layer and at least one additional layer.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to . . . .

Figure 15B:
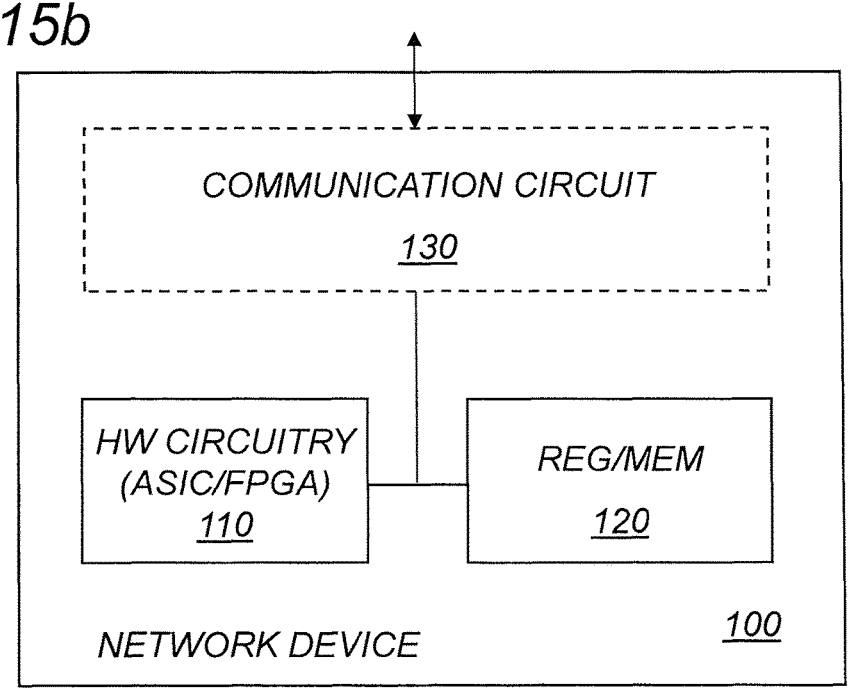
FIG. 15b is a block diagram illustrating an alternative embodiment of a network device according to the proposed technology.

FIG. 15b is a schematic block diagram illustrating another example of a network device 100, based on a hardware circuitry implementation according to an embodiment. Particular examples of suitable hardware circuitry 110 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 120.

Optionally, the network device 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. The communication circuit 130 may be interconnected to the hardware circuitry 110 and/or REG/MEM 120. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 19:
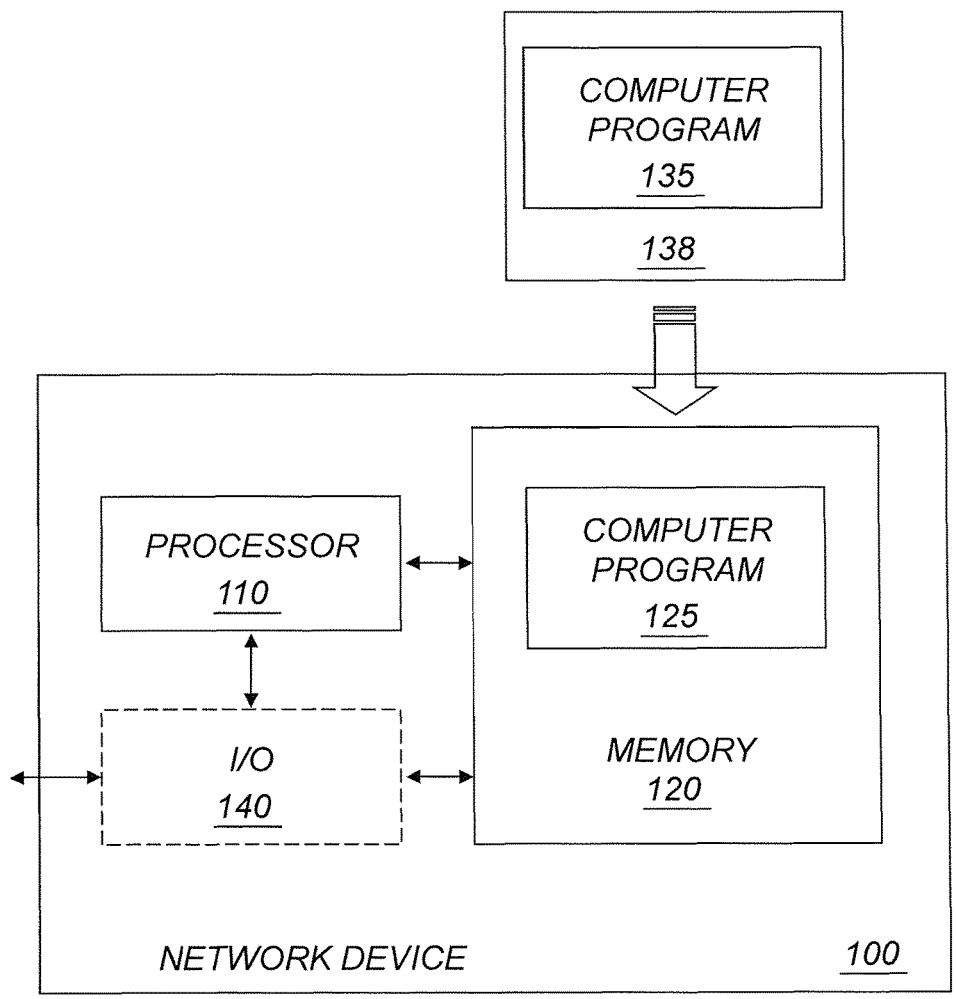
FIG. 19 is a block diagram illustrating a computer program implementation of the proposed technology. It is illustrated how a computer program may be used by a network device according to the proposed technology.

FIG. 19 is a schematic diagram illustrating an example of a computer-implementation according to an embodiment. In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device 140 may also be interconnected to the processor(s) 110 and/or the memory 120 to enable input and/or output of relevant data such as input parameter(s) and/or resulting output parameter(s). The term 'processor' should be interpreted in a general sense as any system or device capable of executing program code or computer program instructions to perform a particular processing, determining or computing task.

The processing circuitry including one or more processors 110 is thus configured to perform, when executing the computer program 125, well-defined processing tasks such as those described herein.

The processing circuitry does not have to be dedicated to only execute the above-described steps, functions, procedure and/or blocks, but may also execute other tasks.

In a particular embodiment, the computer program 125; 135 comprises instructions, which when executed by at least one processor 110, cause the at least one processor 110 to:

select a hierarchy of modulation and coding schemes to use for modulation and coding;

read digitally encoded information and identify, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data; and control modulation and coding of the first set of data using a modulation and coding scheme with high order modulation in order to create a first layer of a data packet; and control modulation and coding of the second set of data by using at least one modulation and coding scheme from the hierarchy of modulation and coding schemes having a modulation order that is lower than the high order modulation, in order to create at least one additional layer of a data packet.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a computer-readable medium 120; 130, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The network device may be any suitable network device in the wireless communication system, or a network device in connection with the wireless communication system. By way of example, the network device may be a suitable network node such a base station or an access point. However, the network device may alternatively be a cloud-implemented network device.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network. The functionality can be distributed or partitioned between at least two individual, but interconnected network devices. The network devices, which may have different functionalities, or parts of the same functionality. There may be additional network devices forming part of such a distributed implementation. The network devices may be part of the same wireless communication system, or one or more of the network devices may be so-called cloud-based network devices located outside of the wireless communication system.

A particular example of a wireless communication system may include an access network and/or a core network 720 and/or an Operations and Support System (OSS), in cooperation with one or more cloud-based network devices. Functionality relevant for the access network and/or the core network and/or the OSS system may be at least partially implemented for execution in a cloud-based network device, with suitable transfer of information between the cloud-based network device and the relevant network nodes and/or communication units in the access network and/or the core network and/or the OSS system.

A Network Device may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to another aspect, there is provided a communication unit 200, wherein the communication unit 200 comprises a network device 100 as described herein. This is illustrated in the block diagram of FIG. 18*b*. The communication unit may be any suitable communication unit. It may in particular be a communication unit in a wireless communication system. By way of example, the communication unit may be a wireless communication device such as a UE, STA or similar end-user device.

In the following, the general non-limiting term "communication unit" as used includes network nodes and/or associated wireless devices according to what has been described earlier.

The proposed technology provides a communication unit 200 configured for transmitting data packets comprising digitally encoded information. The communication unit 200 is configured to generate a data packet, the data packet comprising a first layer of bits being modulated and coded through a modulation and coding scheme with high order modulation, the data packet also comprising at least one additional layer comprising bits of information different from the most robust bits of the first layer, the bits forming the at least one additional layer are a subset of the bits forming the first layer, and where the bits of each of the at least one additional layers have been modulated and coded using a modulation and coding scheme having a modulation order that is lower than the high order modulation of the modulation and coding scheme used to modulate and code the first layer. The communication unit 200 is also configured to transmit the data packet to at least one receiver 300 to enable the receiver 300 to select the particular layers to demodulate and decode in order to obtain the complete content of the data packet.

The proposed technology provides an embodiment of a communication unit 200 wherein the communication unit 200 configured to generate a data packet is also configured to select a hierarchy of modulation and coding schemes to use for modulation and coding of the digitally encoded information. The communication unit 200 configured to generate a data packet is also configured to identify, among the bits in the digitally encoded information and based on the selected hierarchy of modulation and coding schemes, two sets of data, a first set of data and a second set of data, the second set of data being a sub-set of the first set of data and comprising bits being different from the most robust bits of the first set of data. The communication unit 200 configured to generate a data packet is also configured to perform modulation and coding of the first set of data using a modulation and coding scheme with high order modulation in order to create the first layer of the data packet. The communication unit 200 configured to generate a data packet is also configured to perform modulation and coding of the second set of data by using at least one modulation and coding scheme from the hierarchy of modulation and coding schemes having a modulation order that is lower than the high order modulation, in order to create the at least one additional layer of the data packet.

The proposed technology provides an embodiment of a communication unit 200 wherein the bits of the first layer comprises the complete content of the digitally encoded information whereby the created first layer of the data packet comprises the complete modulated and coded content of the digitally encoded information.

The proposed technology provides an embodiment of a communication unit 200, wherein the communication unit 200 configured to identify the second set of data is further configured to determine subsets of the second set of data, each subset comprising bits of information of a specified robustness level, and configured to perform modulation and coding of the second set of data by modulating and coding each individual subset of the subsets using a modulation and coding scheme that is adapted to the specific level of robustness in order to create a number of additional layers of the data packet, where each of the modulation and coding schemes used to modulate the individual subsets are more robust than the high order modulation of the modulation and coding scheme used to modulate and code the first set of data.

The proposed technology provides an embodiment of a communication unit 200 wherein the communication unit 200 configured to generate a data packet also is configured to concatenate the first layer and the at least one additional layer in order to create a data packet with a chain of data packet layers.

The proposed technology provides an embodiment of a communication unit 200 wherein the communication unit 200 is configured to concatenate the layers in either the frequency domain or in the time domain, or in both.

The proposed technology provides an embodiment of a communication unit 200 wherein the communication unit 200 is further configured to add a preamble to the modulated and coded data packet.

The proposed technology provides an embodiment of a communication unit 200 wherein the preamble comprises at least one of the following:

information providing details on how the layers in the data packet was modulated and coded, information relating to the amount of data contained in the data packet.

The proposed technology also provides an embodiment of a communication unit 200 wherein the communication unit 200 is configured to transmit the data packet in a wireless communication network.

The proposed technology also provides an embodiment of a communication unit 200 wherein the communication unit 200 is configured to transmit the data packet by broadcasting or multicasting the data packets to more than one receiver to enable receivers with favorable receiver conditions to obtain the information comprised in the data packet by demodulating and decoding only the first layer, and to enable receivers having less favorable receiver conditions to obtain the information by demodulating and decoding both the first layer and the at least one additional layer.

The proposed technology also provides an embodiment of a communication unit 200 wherein the communication unit 200 is configured to transmit the data packet to a target receiver having largely unknown receiver conditions, to enable a receiver with favorable receiver conditions to obtain the information by demodulating and decoding only the first layer, and to enable receiver having less favorable receiver conditions needs to obtain the information by demodulating and decoding both the first layer and the at least one additional layer.

Figure 16:
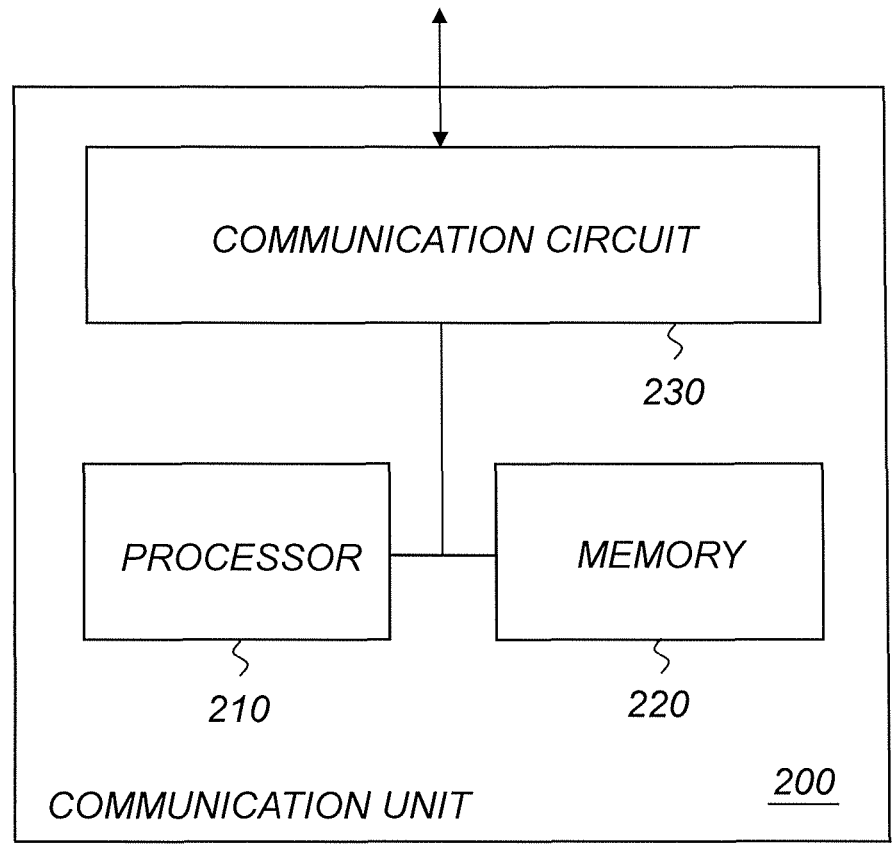
FIG. 16 is a block diagram illustrating an embodiment of a communication unit according to the proposed technology.

The proposed technology also provides an embodiment of a communication unit 200 wherein the communication unit 200 comprises a communication circuitry 210, a processor 220 and a memory 230, the memory 230 comprising instructions executable by the processor 210, whereby the processor 220 is operative to generate a data packet comprising a first layer and at least one additional layer to be transmitted to at least one receiver. FIG. 16 is a schematic block diagram illustrating an example of such a communication unit 200.

Figure 18A:
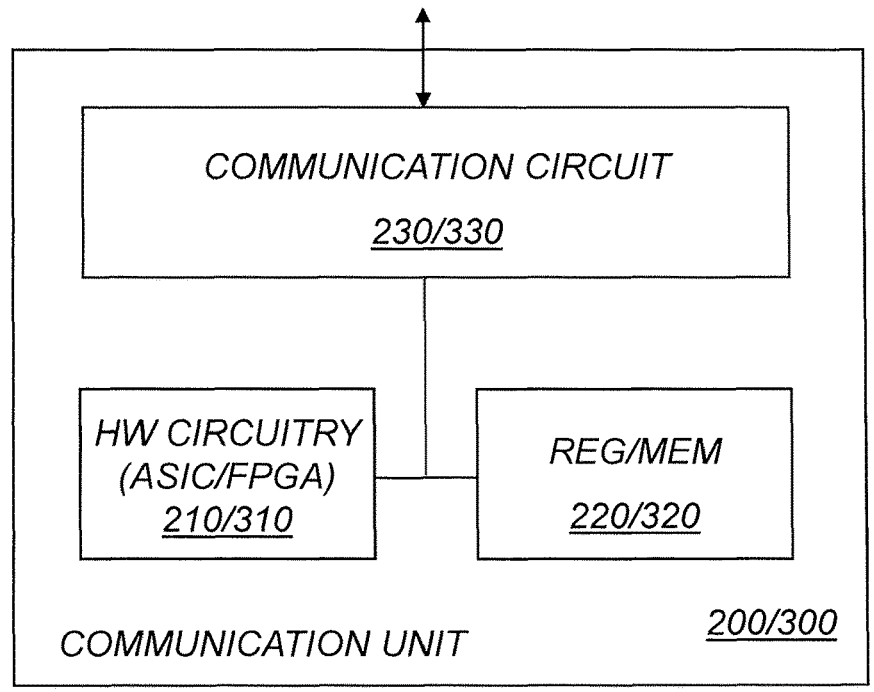
FIG. 18a is a block diagram illustrating an alternative embodiment of a communication unit according to the proposed technology.
Figure 18B:
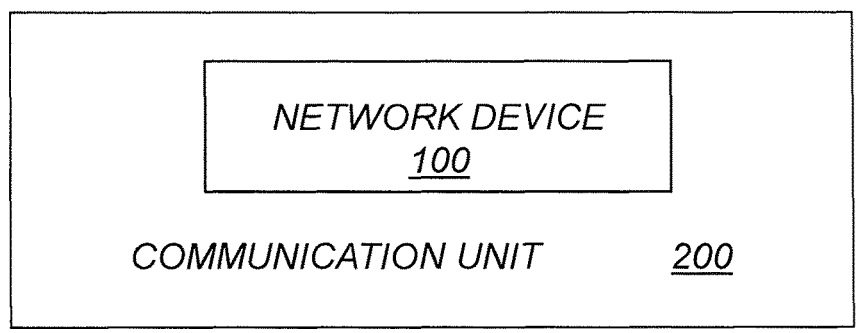
FIG. 18b is a block diagram illustrating an alternative embodiment of a communication unit according to the proposed technology, where the communication unit comprises a network device according to the proposed technology.

FIG. 18a is a schematic block diagram illustrating another example of a communication unit 200, based on a hardware circuitry implementation according to an embodiment. Particular examples of suitable hardware circuitry 210 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 220.

The communication unit 200 also includes a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. The communication circuit 230 may be interconnected to the hardware circuitry 210 and/or REG/MEM 220. By way of example, the communication circuit 130; 230 may include any of the following: a receiver, a transmitter, a transceiver, input/output (I/O) circuitry, input port(s) and/or output port(s). This is schematically illustrated in FIG. 18a.

The proposed technology also a communication unit 300 configured to demodulate and decode information in a data packet comprising digitally encoded information. The communication unit 300 is configured to detect a data packet, the data packet comprising at least two layers, a first layer comprising a first set of data with bits modulated and coded using a modulation and coding scheme with high order modulation, and at least one additional layer comprising a second set of data with bits modulated and coded using a modulation and coding scheme with a modulation order lower than said high order modulation, the second set of data comprising bits different from the most robust bits of the first set of data, the bits forming the at least one additional layer being a subset of the bits forming the first layer. The communication unit 300 is also configured to perform demodulation and decoding of the first layer of the data packet. The communication unit 300 is also configured to determine whether to perform demodulation and decoding of the at least one additional layer. The communication unit 300 is also configured to perform, if it is determined that the at least one additional layer is to be demodulated and decoded, demodulation and decoding of the at least one additional layer in order to retrieve the information carried by the bits in the second set of data.

The proposed technology also provides an embodiment of a communication unit 300 wherein the bits of the first layer comprises the complete content of the digitally encoded information whereby the created first layer of the data packet comprises the complete modulated and coded content of the digitally encoded information.

The proposed technology also provides an embodiment of a communication unit 300 wherein the data packet also comprises a preamble, the preamble comprising at least one of the following:

information providing details on how the layers of the data packet was modulated and coded, information relating to the amount of data contained in the data packet.

Wherein the communication unit 300 is configured to perform demodulation and decoding S200, S400 of the first layer and second layer of the data packet based on the information in the preamble.

The proposed technology also provides an embodiment of a communication unit 300 wherein the communication unit 300 is configured to determine whether to perform demodulation and decoding of the at least one additional layer based on information comprised in the preamble.

The proposed technology also provides an embodiment of a communication unit 300, wherein the communication unit 300 is configured to determine whether to perform demodulation and decoding of the at least one additional layer based on a comparison of the quality of the detected data packet and a pre-determined threshold.

The proposed technology also provides an embodiment of a communication unit 300 wherein the communication unit 300 is configured to determine whether to perform demodulation and decoding of the at least one additional layer by computing a Cyclic Redundancy Check, CRC, for the first layer and determine that a demodulation and decoding of the at least one additional layer is to be performed if the checksum of the Cyclic Redundancy Check is not correct.

Figure 17:
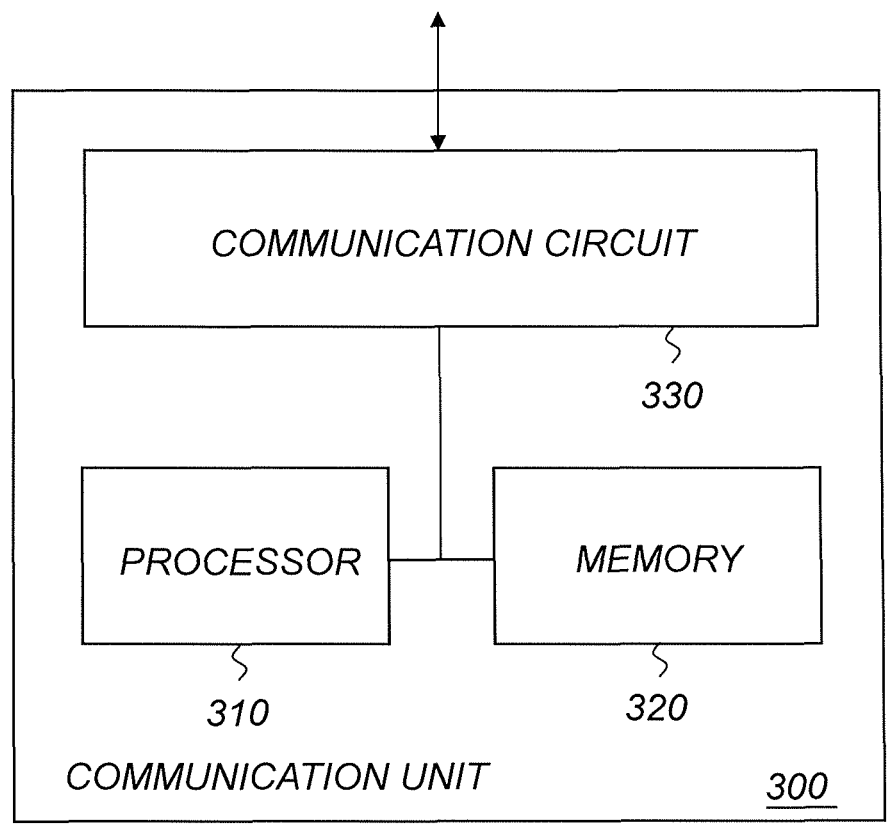
FIG. 17 is a block diagram illustrating an embodiment of a communication unit according to the proposed technology.

The proposed technology also provides an embodiment of a communication unit 300, wherein the communication unit 300 comprises communication circuitry 330, a processor 310 and a memory 320, the memory 320 comprising instructions executable by the processor 310, whereby the processor 310 is operative to decode information in a data packet comprising digitally encoded information. This is illustrated in the block diagram of FIG. 17. FIG. 18a is a schematic block diagram illustrating another example of a communication unit 300, based on a hardware circuitry implementation according to an embodiment. Particular examples of suitable hardware circuitry 310 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM) 320. The communication unit also includes a communication circuit 330. The communication circuit 330 may include functions for wired and/or wireless communication with other devices and/or network nodes in the network. In a particular example, the communication circuit 330 may be based on radio circuitry for communication with one or more other nodes, including transmitting and/or receiving information. The communication circuit 330 may be interconnected to the processor 310 and/or memory 320. The communication circuit 330 may be interconnected to the hardware circuitry 310 and/or REG/MEM 320. By way of example, the communication circuit 330 may include any of the following: a receiver, a transmitter, a transceiver, input/output (I/O) circuitry, input port(s) and/or output port(s).

The flow diagram or diagrams presented herein may be regarded as a computer flow diagram or diagrams, when performed by one or more processors. A corresponding network device may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 20:
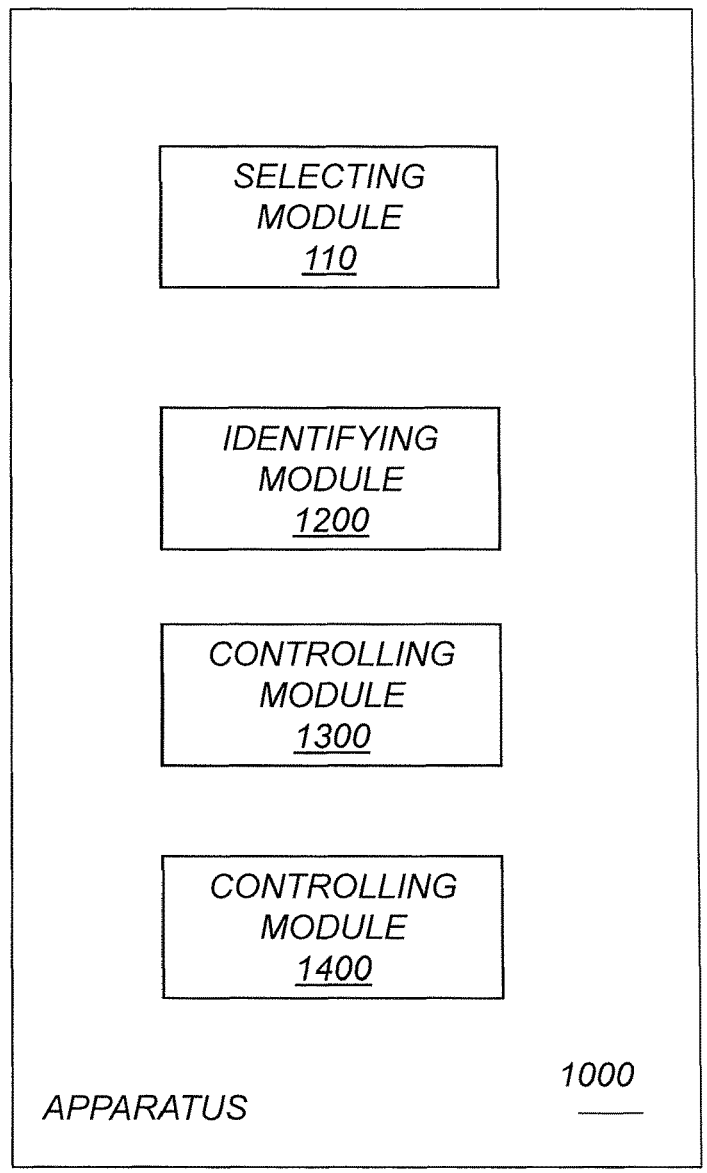
FIG. 20 is a block diagram illustrating an alternative embodiment of a network device according to the proposed technology.

FIG. 20 is a schematic diagram illustrating an example of an apparatus 1000 for performing modulation and coding of a data packet comprising digitally encoded information. The apparatus comprises a selecting module 1100 for selecting a hierarchy of modulation and coding schemes to use for modulation and coding. The apparatus also comprises an identifying module 1200 for reading digitally encoded information and identify, among the bits in the digitally encoded information and based on the selected hierarchy of modulation and coding schemes, two sets of data, a first set of data and a second set of data, the second set of data being a sub-set of the first set of data and comprising bits different from the most robust bits of the first set of data. The apparatus also comprises a controlling module 1300 for controlling modulation and coding of the first set of data using a modulation and coding scheme with high order modulation in order to create a first layer of a data packet. The apparatus also comprises a controlling module 1400 for controlling modulation and coding of the second set of data by using at least one modulation and coding scheme from the hierarchy of modulation and coding schemes having a modulation order that is lower than the high order modulation, in order to create at least one additional layer of a data packet.

Alternatively it is possible to realize the module(s) in FIG. 20 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for modulating and coding a data packet comprising digitally encoded information, wherein the method comprises:
    selecting a hierarchy of modulation and coding schemes to use for modulation and coding of said digitally encoded information;
    identifying, among the bits in said digitally encoded information and based on the selected hierarchy of modulation and coding schemes, two sets of data, a first set of data and a second set of data, said second set of data being a sub-set of said first set of data and comprising bits different from the most robust bits of said first set of data;
    performing modulation and coding of said first set of data using a modulation and coding scheme with high order modulation in order to create a first layer of said data packet;
    performing modulation and coding of said second set of data by using at least one modulation and coding scheme from said hierarchy of modulation and coding schemes having a modulation order that is lower than said high order modulation, in order to create at least one additional layer of the data packet; and
    adding a preamble to said modulated and coded data packet, said preamble comprising at least one of the following: information providing details on how the layers of the data packet was modulated and coded, and information relating to the amount of data contained in the data packet.

2. The method according to claim 1, wherein said first set of data comprises the complete content of said digitally encoded information whereby the created first layer of said data packet comprises the complete modulated and coded content of said digitally encoded information.

3. The method according to claim 1, wherein the step of identifying said second set of data also comprises determining subsets of said second set of data, each subset comprising bits of information of a specified robustness level, and
    wherein the step of performing modulation and coding of said second set of data comprises modulating and coding each individual subset of said subsets using a modulation and coding scheme that is adapted to the specific level of robustness in order to create a number of additional layers of the data packet, each of the modulation and coding schemes used to modulate the subsets being more robust than the modulation and coding scheme used to modulate and code said first set of data.

4. A method for transmitting data packets comprising digitally encoded information, wherein the method comprises:
    generating a data packet, said data packet comprising a first layer of bits being modulated and coded through a modulation and coding scheme with high order modulation, said data packet also comprising at least one additional layer comprising bits of information different from the most robust bits of said first layer, the bits forming said at least one additional layer being a subset of the bits forming the first layer, and where the bits of each of said at least one additional layers have been modulated and coded using a modulation and coding scheme having a modulation order that is lower than the high order modulation of the modulation and coding scheme used to modulate and code said first layer, wherein generating the data packet further comprises adding a preamble to said modulated and coded data packet, said preamble comprising at least one of the following: information providing details on how the layers in the data packet was modulated and coded, and information relating to the amount of data contained in the data packet; and
    transmitting said data packet to at least one receiver to enable said receiver to select the particular layers to demodulate and decode in order to obtain the complete content of said data packet.

5. The method according to claim 4, wherein the step of generating a data packet further comprises:
    selecting a hierarchy of modulation and coding schemes to use for modulation and coding of said digitally encoded information;
    identifying, among the bits in said digitally encoded information and based on the selected hierarchy of modulation and coding schemes, two sets of data, a first set of data and a second set of data, said second set of data being a sub-set of said first set of data and comprising bits being different from the most robust bits of said first set of data;
    performing modulation and coding of said first set of data using a modulation and coding scheme with high order modulation in order to create said first layer of said data packet; and
    performing modulation and coding of said second set of data by using at least one modulation and coding scheme from said hierarchy of modulation and coding schemes having a modulation order that is lower than said high order modulation, in order to create said at least one additional layer of the data packet.

6. The method according to claim 5, wherein the bits of said first layer comprises the complete content of said digitally encoded information whereby the created first layer of said data packet comprises the complete modulated and coded content of said digitally encoded information.

7. The method according to claim 5, wherein the step of identifying said second set of data also comprises determining subsets of said second set of data, each subset comprising bits of information of a specified robustness level, and
    wherein the step of performing modulation and coding of said second set of data comprises modulating and coding each individual subset of said subsets using a modulation and coding scheme that is adapted to the specific level of robustness in order to create a number of additional layers of the data packet, each of the modulation and coding schemes used to modulate the individual subsets having lower order modulation than the high order modulation of the modulation and coding scheme used to modulate and code said first set of data.

8. The method according to claim 4, wherein the step of transmitting said data packet comprises broadcasting or multicasting said data packets to more than one receiver to enable receivers with favorable receiver conditions to obtain the information comprised in the data packet by demodulating and decoding only the first layer, and to enable receivers having less favorable receiver conditions to obtain the information by demodulating and decoding both the first layer and said at least one additional layer.

9. The method according to claim 4, wherein the step of transmitting said data packet comprises transmitting the data packet to a target receiver having largely unknown receiver conditions, enabling a receiver with favorable receiver conditions to obtain the information by demodulating and decoding only the first layer, and enabling a receiver having less favorable receiver conditions to obtain the information by demodulating and decoding both the first layer and said at least one additional layer.

10. A network device configured for modulating and coding a data packet comprising digitally encoded information, the network device comprising:
  memory; and
  processing circuitry coupled to the memory, the processing circuitry configured to:
  select a hierarchy of modulation and coding schemes to use for modulation and coding of said digitally encoded information;
  identify, among the bits in said digitally encoded information and based on the selected hierarchy of modulation and coding schemes, two sets of data, a first set of data and a second set of data, said second set of data being a sub-set of said first set of data and comprising bits different from the most robust bits of said first set of data; the network device is configured to perform modulation and coding of said first set of data using a modulation and coding scheme with high order modulation in order to create a first layer of said data packet;
  perform modulation and coding of said second set of data by using at least one modulation and coding scheme from said hierarchy of modulation and coding schemes having a modulation order that is lower than said high order modulation, in order to create at least one additional layer of the data packet; and
  add a preamble to said modulated and coded data packet, said preamble comprising at least one of the following: information providing details on how the layers of the data packet was modulated and coded, and information re to the amount of data contained in e data packet.

11. The network device according to claim 10, wherein said first set of data comprises the complete content of said digitally encoded information whereby the created first layer of said data packet comprises the complete modulated and coded content of said digitally encoded information.

12. The network device according to claim 10, wherein the processing circuitry is further configured to determine subsets of said second set of data, each subset comprising bits of information of a specified robustness level, and configured to perform modulation and coding of said second set of data by modulating and coding each individual subset of said subsets using a modulation and coding scheme that is adapted to the specific level of robustness in order to create a number of additional layers of the data packet, each of the modulation and coding schemes used to modulate the subsets having lower order modulation than the modulation order of the modulation and coding scheme used to modulate and code said first set of data.

13. A communication device configured for transmitting data packets comprising digitally encoded information, the communication device comprising:
  memory; and
  processing circuitry coupled to the memory, the processing circuitry configured to:
  generate a data packet, said data packet comprising a first layer of bits being modulated and coded through a modulation and coding scheme with high order modulation, said data packet also comprising at least one additional layer comprising bits of information different from the most robust bits of said first layer, the bits forming said at least one additional layer being a subset of the bits forming the first layer, and where the bits of each of said at least one additional layers have been modulated and coded using a modulation and coding scheme having a modulation order that is lower than the high order modulation of the modulation and coding scheme used to modulate and code said first layer, wherein generating the data packet further comprises adding a preamble to said modulated and coded data packet, said preamble comprising at least one of the following: information providing details on how the layers in the data packet was modulated and coded, and information relating to the amount of data contained in the data packet; and
  transmit said data packet to at least one receiver to enable said receiver to select the particular layers to demodulate and decode in order to obtain the complete content of said data packet.

14. The communication device according to claim 13, wherein generating the data packet further comprises:
  selecting a hierarchy of modulation and coding schemes to use for modulation and coding of said digitally encoded information;
  identifying, among the bits in said digitally encoded information and based on the selected hierarchy of modulation and coding schemes, two sets of data, a first set of data and a second set of data, said second set of data being a sub-set of said first set of data and comprising bits being different from the most robust bits of said first set of data;
  performing modulation and coding of said first set of data using a modulation and coding scheme with high order modulation in order to create said first layer of said data packet; and
  performing modulation and coding of said second set of data by using at least one modulation and coding scheme from said hierarchy of modulation and coding schemes having a modulation order that is lower than said high order modulation, in order to create said at least one additional layer of the data packet.

15. The communication device according to claim 13, wherein the bits of said first layer comprises the complete content of said digitally encoded information whereby the created first layer of said data packet comprises the complete modulated and coded content of said digitally encoded information.

16. The communication device according to claim 13, wherein identifying said second set of data further comprises determining subsets of said second set of data, each subset comprising bits of information of a specified robustness level, and performing modulation and coding of said second set of data by modulating and coding each individual subset of said subsets using a modulation and coding scheme that is adapted to the specific level of robustness in order to create a number of additional layers of the data packet, where each of the modulation and coding schemes used to modulate the individual subsets have lower order modulation than the high order modulation of the modulation and coding scheme used to modulate and code said first set of data.

17. The communication device according to claim 13, wherein the processing circuitry is further configured to:
transmit said data packet by broadcasting or multicasting said data packets to more than one receiver to enable receivers with favorable receiver conditions to obtain the information comprised in the data packet by demodulating and decoding only the first layer, and to enable receivers having less favorable receiver conditions to obtain the information by demodulating and decoding both the first layer and said at least one additional layer.

18. The communication device according to claim 13, wherein the processing circuitry is further configured to transmit said data packet to a target receiver having largely unknown receiver conditions, to enable a receiver with favorable receiver conditions to obtain the information by demodulating and decoding only the first layer, and to enable a receiver having less favorable receiver conditions needs to obtain the information by demodulating and decoding both the first layer and said at least one additional layer.

19. A computer program stored on a non-transitory computer readable medium, the computer program comprising instructions, which when executed by at least one processor, causes the at least one processor to:
select a hierarchy of modulation and coding schemes to use for modulation and coding;
read digitally encoded information and identify, among the bits in said digitally encoded information and based on the selected hierarchy of modulation and coding schemes, two sets of data, a first set of data and a second set of data, said second set of data being a sub-set of said first set of data and comprising bits different from the most robust bits of said first set of data;
control modulation and coding of said first set of data using a modulation and coding scheme with high order modulation in order to create a first layer of a data packet;
control modulation and coding of said second set of data by using at least one modulation and coding scheme from said hierarchy of modulation and coding schemes having a modulation order that is lower than said high order modulation, in order to create at least one additional layer of a data packet; and
add a preamble to said modulated and coded data packet, said preamble comprising at least one of the following: information providing details on how the layers of the data packet was modulated and coded, and information relating to the amount of data contained in the data packet.

20. An apparatus for performing modulation and coding of a data packet comprising digitally encoded information, wherein the apparatus comprises:
memory; and
processing circuitry coupled to the memory, the processing circuitry configured to:
select a hierarchy of modulation and coding schemes to use for modulation and coding;
read digitally encoded information and identify, among the bits in said digitally encoded information and based on the selected hierarchy of modulation and coding schemes, two sets of data, a first set of data and a second set of data, said second set of data being a sub-set of said first set of data and comprising bits different from the most robust bits of said first set of data;
control modulation and coding of said first set of data using a modulation and coding scheme with high order modulation in order to create a first layer of a data packet;
control modulation and coding of said second set of data by using at least one modulation and coding scheme from said hierarchy of modulation and coding schemes having a modulation order that is lower than said high order modulation, in order to create at least one additional layer of a data packet; and
add a preamble to said modulated and coded data packet, said preamble comprising at least one of the following: information providing details on how the layers of the data packet was modulated and coded, and information relating to the amount of data contained in the data packet.

* * * * *